United States Patent
Ishii et al.

(10) Patent No.: US 7,904,634 B2
(45) Date of Patent: Mar. 8, 2011

(54) STORAGE TERMINAL AND INFORMATION PROCESSING SYSTEM

(75) Inventors: Nobutake Ishii, Tokyo (JP); Atsushi Narusawa, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 526 days.

(21) Appl. No.: 12/015,889

(22) Filed: Jan. 17, 2008

(65) Prior Publication Data

US 2008/0215794 A1 Sep. 4, 2008

(30) Foreign Application Priority Data

Mar. 1, 2007 (JP) ................................. 2007-051953

(51) Int. Cl.
*G06F 12/00* (2006.01)

(52) U.S. Cl. ......... 711/100; 711/156; 711/170; 711/173; 711/E12.001

(58) Field of Classification Search .................. None
See application file for complete search history.

(56) References Cited

U.S. PATENT DOCUMENTS 7,103,660 B2 9/2006 Nakamura

FOREIGN PATENT DOCUMENTS

| JP | 2001244961 A | * | 9/2001 |
| JP | A-2001-244961 | | 9/2001 |
| JP | A-2001-312474 | | 11/2001 |
| JP | 2004030437 A | * | 1/2004 |
| JP | A-2004-030437 | | 1/2004 |

* cited by examiner

*Primary Examiner* — Shawn X Gu
(74) *Attorney, Agent, or Firm* — Oliff & Berridge, PLC

(57) ABSTRACT

A storage terminal includes an information storage unit, an association storage unit, a receiving unit, and a processing unit. The information storage unit includes a plurality of storage areas having individually different identifiers assigned thereto. The association storage unit stores the identifiers individually in association with different communication addresses on a network. The receiving unit receives a request including one of the communication addresses. The processing unit identifies the identifier associated with the communication address included in the request with reference to the association storage unit, and executes processing according to the request on the storage area having the identified identifier assigned thereto.

10 Claims, 13 Drawing Sheets

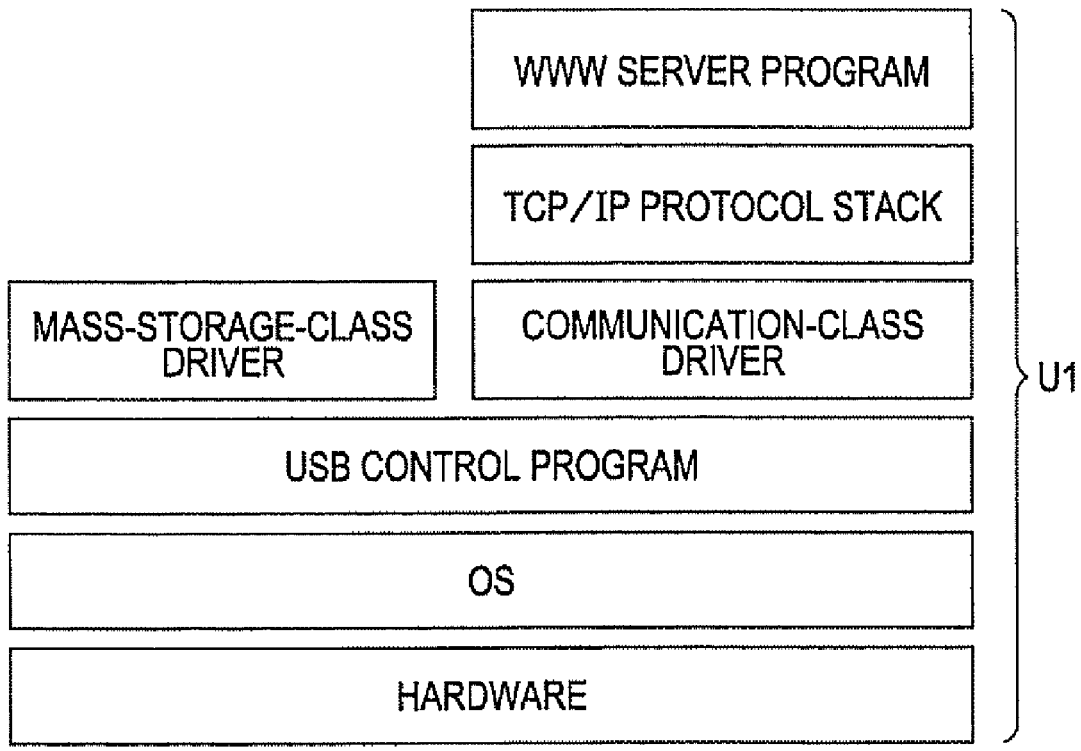

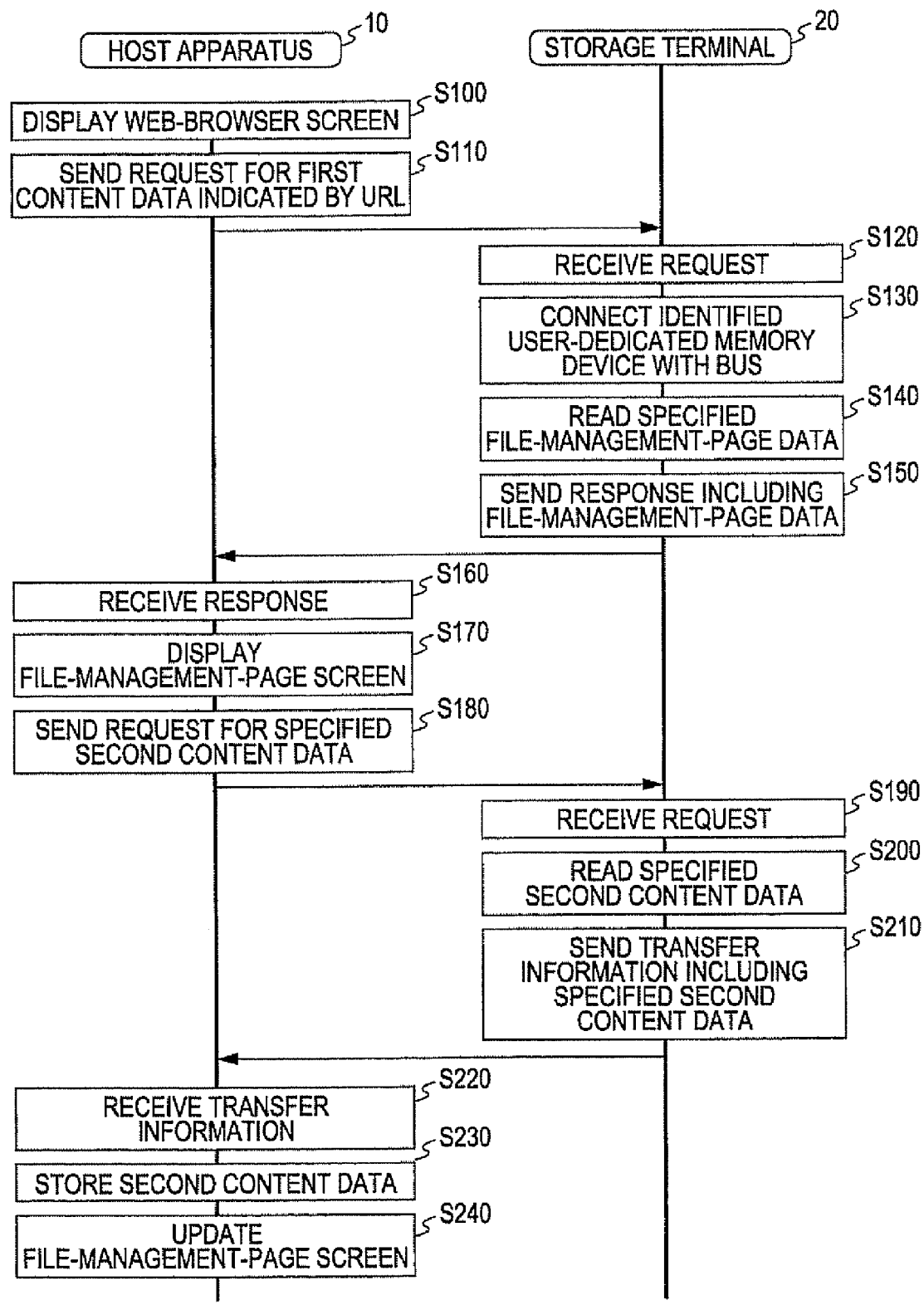

US 7,904,634 B2

STORAGE TERMINAL AND INFORMATION PROCESSING SYSTEM

BACKGROUND

1. Technical Field

The present invention relates to techniques for executing processing in each storage area on an individual bases.

2. Related Art

Various schemes have been proposed for managing functions or services provided to users on a user-by-user or group-by-group basis. For example, according to techniques disclosed in JP-A-2001-312474, in order to prevent leakage of information that is managed on a user-by-user basis to an unauthorized third party, for each device on a network, a user allowed to use the device is defined in advance so that only the user is allowed to use the device or to use a certain function of the device.

Recently, flash memories called USB (Universal Serial Bus) memories are commonly available. A USB memory can be connected to or disconnected from a host apparatus having a USB port. By connecting a USB memory to a USB port of a host apparatus, a user of the host apparatus can execute various types of processing, such as reading or deleting data stored in the USB memory or writing data to the USB memory. Since USB memories are portable, a single USB memory can be shared by a plurality of users. In that case, data of one user, stored on the USB memory, could be browsed or tampered with by other users.

SUMMARY

An advantage of some aspects of the invention is that processing can be executed according to a request in a storage terminal shared by a plurality of users, such as a USB memory, without causing leakage of data of a user to other users.

According to an aspect of the invention, there is provided a storage terminal. The storage terminal includes an information storage unit that includes a plurality of storage areas having individually different identifiers assigned thereto; an association storage unit that stores the identifiers individually in association with different communication addresses on a network; a receiving unit that receives a request including one of the communication addresses; and a processing unit that identifies the identifier associated with the communication address included in the request with reference to the association storage unit and that executes processing according to the request on the storage area having the identified identifier assigned thereto.

Preferably, the storage terminal may be configured as follows. The storage terminal further includes a sending unit that sends information to a client apparatus on which an Internet browser program is executed. Each of the storage areas stores first information and second information, the first information being information that is displayed according to a procedure defined in the Internet browser program, and the second information being information that is output according to a procedure defined in a program different from the Internet browser program. The receiving unit receives a request sent from the client apparatus. The processing unit executes processing according to the request by executing an Internet server program. When the request received from the client apparatus by the receiving unit is a request specifying the first information, the processing unit reads the specified first information from the storage area having the identified identifier assigned thereto, and sends the first information from the sending unit to the client apparatus according to a communication standard for exchange of information by the storage terminal. When the request received from the client apparatus by the receiving unit is a request specifying the second information, the processing unit reads the specified second information from the storage area having the identified identifier assigned thereto, and sends the second information from the sending unit to the client apparatus according to a read/write standard for reading information from or writing information to the information storage unit.

Also preferably, the storage terminal may be configured as follows. The storage terminal further includes a sending unit that sends information to a client apparatus on which an Internet browser program is executed. Each of the storage areas stores first information and second information, the first information being information that is displayed according to a procedure defined in the Internet browser program, and the second information being information that is output according to a procedure defined in a program different from the Internet browser program. The receiving unit receives a request sent from the client apparatus. The processing unit executes processing according to the request by executing an Internet server program. When the request received from the client apparatus by the receiving unit is a request specifying the first information or the second information, the processing unit reads the specified first information or second information from the storage area having the identified identifier assigned thereto, and sends the first information or second information from the sending unit to the client apparatus according to a read/write standard for reading information from or writing information to the information storage unit.

According to another aspect of the invention, there is provided a storage terminal. The storage terminal includes an information storage unit that includes a plurality of storage areas having individually different identifiers assigned thereto; an association storage unit that stores the identifiers in association with pieces of user identification information individually assigned to a plurality of users; a receiving unit that receives a request including one of the pieces of user identification information from a client apparatus on which an Internet browser program is executed; a sending unit that sends information to the client apparatus; and a processing unit that identifies the identifier associated with the piece of user identification information included in the request with reference to the association storage unit and that executes processing according to the request on the storage area having the identified identifier assigned thereto. Each of the storage areas stores first information and second information, the first information being information that is displayed according to a procedure defined in the Internet browser program, and the second information being information that is output according to a procedure defined in a program different from the Internet browser program. The receiving unit receives the request sent from the client apparatus. The processing unit executes processing according to the request by executing an Internet server program. When the request received from the client apparatus by the receiving unit is a request specifying the first information, the processing unit reads the specified first information from the storage area having the identified identifier assigned thereto, and sends the first information from the sending unit to the client apparatus according to a communication standard for exchange of information by the storage terminal. When the request received from the client apparatus by the receiving unit is a request specifying the second information, the processing unit reads the specified second information from the storage area having the identified identifier assigned thereto, and sends the second information from the sending unit to the client apparatus according to a read/write standard for reading information from or writing information to the information storage unit.

According to another aspect of the invention, there is provided a storage terminal. The storage terminal includes an information storage unit that includes a plurality of storage areas having individually different identifiers assigned thereto; an association storage unit that stores the identifiers in association with pieces of user identification information individually assigned to a plurality of users; a receiving unit that receives a request including one of the pieces of user identification information from a client apparatus on which an Internet browser program is executed; a sending unit that sends information to the client apparatus; and a processing unit that identifies the identifier associated with the piece of user identification information included in the request with reference to the association storage unit and that executes processing according to the request on the storage area having the identified identifier assigned thereto. Each of the storage areas stores first information and second information, the first information being information that is displayed according to a procedure defined in the Internet browser program, and the second information being information that is output according to a procedure defined in a program different from the Internet browser program. The receiving unit receives the request sent from the client apparatus. The processing unit executes processing according to the request by executing an Internet server program. When the request received from the client apparatus by the receiving unit is a request specifying the first information or the second information, the processing unit reads the specified first information or second information from the storage area having the identified identifier assigned thereto, and sends the first information or second information from the sending unit to the client apparatus according to a read/write standard for reading information from or writing information to the information storage unit.

Preferably, the storage terminal further includes a connection switching unit that connects the processing unit via a data transmission path with the storage area having the identified identifier assigned thereto, while not connecting the processing unit via a data transmission path with the storage area or areas having assigned thereto the identifier or identifiers other than the identified identifier. In this case, the processing unit executes the processing according to the request on the storage area connected by the connection switching means via the data transmission path.

Preferably, the communication standard for exchange of information by the storage terminal is the Communication Class, and the read/write standard for reading information from or writing information to the information storage unit is the Mass Storage Class.

Also preferably, the receiving unit and the sending unit exchange the request or information with the client apparatus according to the Universal Serial Bus standard.

According to another aspect of the invention, there is provided an information processing system. The information processing system includes a client apparatus and a storage terminal. The client apparatus includes a request sending unit that sends a request to the storage terminal, the request including one of a plurality of different communication addresses on a network. The storage terminal includes an information storage unit that includes a plurality of storage areas having individually different identifiers assigned thereto; an association storage unit that stores the identifiers individually in association with the communication addresses; a receiving unit that receives the request sent from the client apparatus; and a processing unit that identifies the identifier associated with the communication address included in the request with reference to the association storage unit and that executes processing according to the request on the storage area having the identified identifier assigned thereto.

According to another aspect of the invention, there is provided an information processing system. The information processing system includes a client apparatus that executes an Internet browser program, and a storage terminal that executes an Internet server program. The client apparatus includes a request sending unit that sends a request to the storage terminal, the request including one of pieces of user identification information individually assigned to a plurality of users. The storage terminal includes an information storage unit that includes a plurality of storage areas having individually different identifiers assigned thereto; an association storage unit that stores the identifiers individually in association with the pieces of user identification information; a receiving unit that receives the request sent from the client apparatus; a sending unit that sends information to the client apparatus; and a processing unit that identifies the identifier associated with the piece of user identification information included in the request with reference to the association storage unit and that executes processing according to the request on the storage area having the identified identifier assigned thereto. Each of the storage areas stores first information and second information, the first information being information that is displayed according to a procedure defined in the Internet browser program, and the second information being information that is output according to a procedure defined in a program different from the Internet browser program. The processing unit executes the processing according to the request by executing the Internet server program. When the request received from the client apparatus by the receiving unit is a request specifying the first information, the processing unit reads the specified first information from the storage area having the identified identifier assigned thereto, and sends the first information from the sending unit to the client apparatus according to a communication standard for exchange of information by the storage terminal. When the request received from the client apparatus by the receiving unit is a request specifying the second information, the processing unit reads the specified second information from the storage area having the identified identifier assigned thereto, and sends the second information from the sending unit to the client apparatus according to a read/write standard for reading information from or writing information to the information storage unit.

According to another aspect of the invention, there is provided an information processing system. The information processing system includes a client apparatus that executes an Internet browser program, and a storage terminal that executes an Internet server program. The client apparatus includes a request sending unit that sends a request to the storage terminal, the request including one of pieces of user identification information individually assigned to a plurality of users. The storage terminal includes an information storage unit that includes a plurality of storage areas having individually different identifiers assigned thereto; an association storage unit that stores the identifiers individually in association with the pieces of user identification information; a receiving unit that receives the request sent from the client apparatus; a sending unit that sends information to the client apparatus; and a processing unit that identifies the identifier associated with the piece of user identification information included in the request with reference to the association storage unit and that executes processing according to the request on the storage area having the identified identifier assigned thereto.

Each of the storage areas stores first information and second information, the first information being information that is displayed according to a procedure defined in the Internet browser program, and the second information being information that is output according to a procedure defined in a program different from the Internet browser program. The processing unit executes the processing according to the request by executing the Internet server program, and when the request received from the client apparatus by the receiving unit is a request specifying the first information or the second information, the processing unit reads the specified first information or second information from the storage area having the identified identifier assigned thereto, and sends the first information or second information from the sending unit to the client apparatus according to a read/write standard for reading information from or writing information to the information storage unit.

BRIEF DESCRIPTION OF THE DRAWINGS

The invention will be described with reference to the accompanying drawings, wherein like numbers reference like elements.

FIG. 5 is a diagram showing a hierarchical structure of software.

FIG. 6 is a diagram showing an example of a dedicated-memory switching table.

FIG. 7 is a sequence diagram showing an operation in the first embodiment.

DESCRIPTION OF EXEMPLARY EMBODIMENTS

Now, embodiments of the invention will be described.

First Embodiment (1) Configuration

Figure 1:
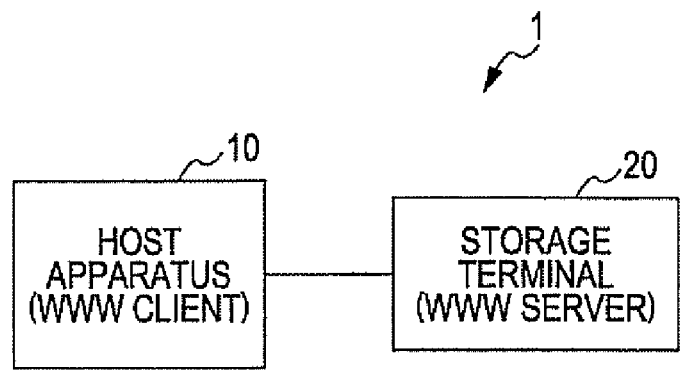
FIG. 1 is a block diagram showing the configuration of an information processing system.

FIG. 1 is a block diagram showing the configuration of an information processing system 1 according to a first embodiment of the invention. Referring to FIG. 1, the information processing system 1 includes a host apparatus 10 that functions as a WWW (World Wide Web) client, and a storage terminal 20 that functions as a WWW server. The host apparatus 10 is a client apparatus, such as a personal computer, a personal digital assistant (PDA), a cellular phone, or a display terminal called electronic paper. The storage terminal 20 is a terminal that can be connected to the host apparatus 10 and that stores information, such as an auxiliary storage terminal called a USB memory. The storage terminal 20 has a connection interface, such as a USB connector. By connecting the USB connector with a USB port of the host apparatus 10, the host apparatus 10 and the storage terminal 20 are allowed to mutually exchange data according to the USB standard.

Next, the configuration of the host apparatus 10 will be described.

Figure 2:
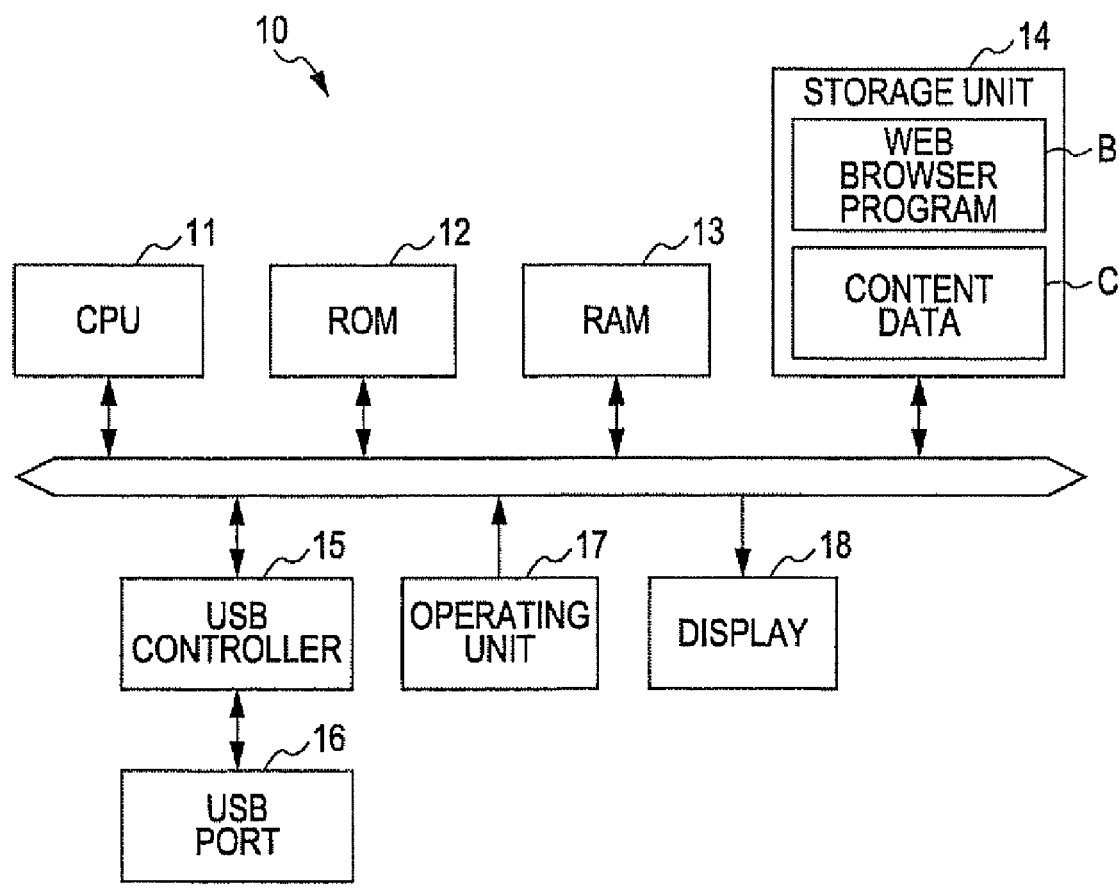
FIG. 2 is a block diagram showing the configuration of a host apparatus.

FIG. 2 is a block diagram showing the configuration of the host apparatus 10. Referring to FIG. 2, the host apparatus 10 includes a central processing unit (CPU) 11, a read-only memory (ROM) 12, a random access memory (RAM) 13, a storage unit 14, a USB controller 15, a USB port 16, an operating unit 17, and a display 18. The CPU 11 reads a program stored in the ROM 12 or the storage unit 14 and loads the program into the RAM 13, and executes the program to control components of the host apparatus 10.

The storage unit 14 is, for example, a hard disk, and the storage unit 14 stores a Web browser program B and various types of content data C. The Web browser program B (Internet browser program) is a program for parsing Web page data written in a markup language, such as the HyperText Markup Language (HTML), and displaying information corresponding to the Web page data on the display 18. The content data C includes various types of content data, such as data of music that is played back according to a procedure defined in a music processing program, data of an image that is displayed according to a procedure defined in an image processing program, or data of a document that is displayed according to a procedure defined in a document processing program. The content data C includes data downloaded from the storage terminal 20 acting as a WWW server to the host apparatus 10 acting as a WWW client and stored in the storage unit 14.

The USB controller 15 carries out communications with a USB controller 21 of the storage terminal 20, which will be described later, under the control of the CPU 11. The USB port 16 is connected to a USB connector 23 of the storage terminal 20, which will be described later, either directly or via a USB cable. The operating unit 17 has various keys, and the operating unit 17 outputs a signal corresponding to a key that is pressed to the CPU 11. The display 18 is, for example, a liquid crystal display, and the display 18 displays various screens under the control of the CPU 11.

Next, the configuration of the storage terminal 20 will be described.

Figure 3:
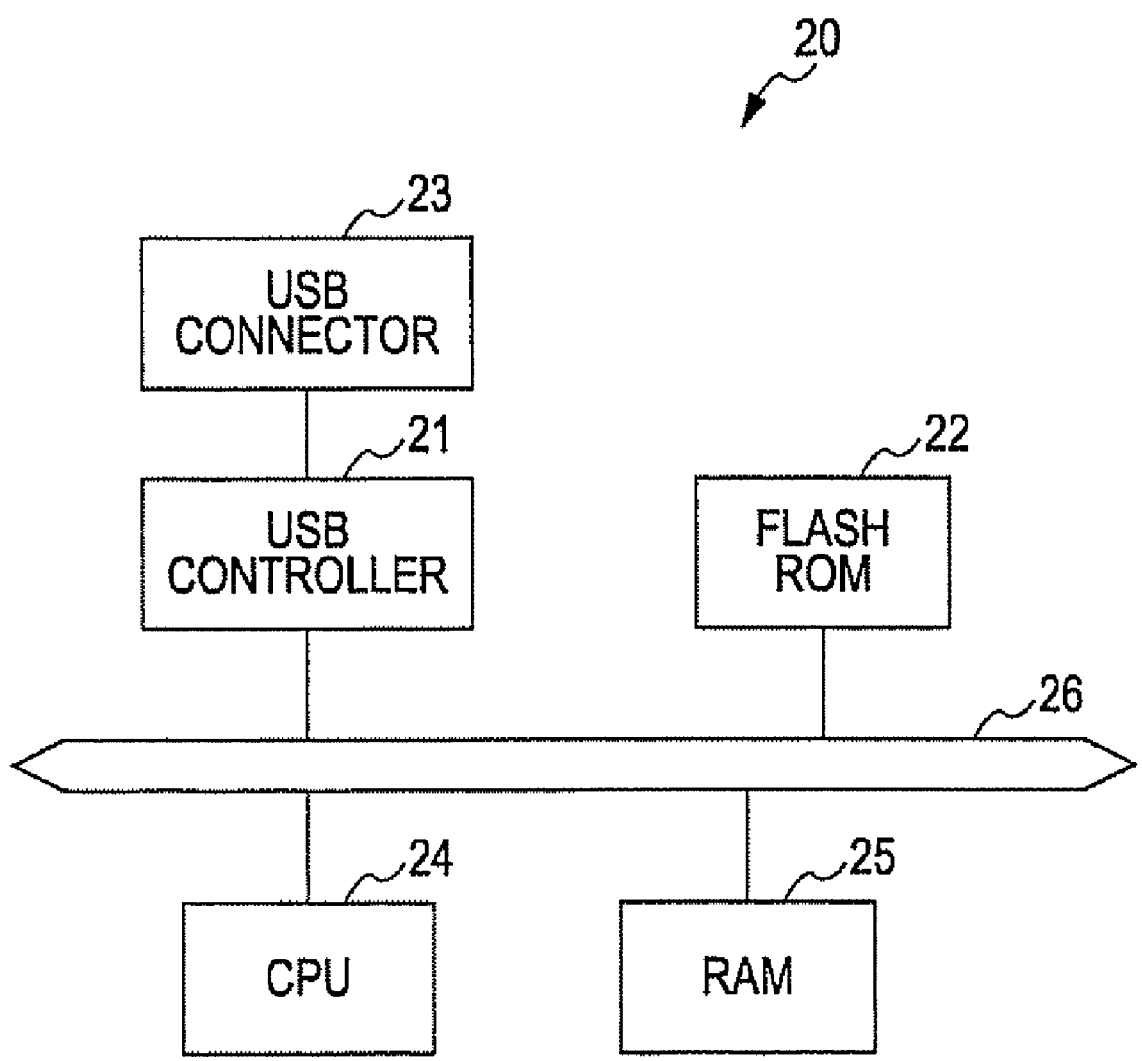
FIG. 3 is a block diagram showing the configuration of a storage terminal.

FIG. 3 is a block diagram showing the configuration of the storage terminal 20. Referring to FIG. 3, the storage terminal 20 includes a USB controller 21, a flash ROM 22, a USB connector 23, a CPU 24, a RAM 25, and a bus 26. The USB controller 21 carries out communications with the USB controller 15 of the host apparatus 10 (WWW client) according to the USB standard under the control of the CPU 24. The flash ROM 22 is a non-volatile memory device, such as an electrically erasable and programmable read-only memory (EEPROM) or a flash memory. The USB connector 23 is an interface that can be connected to or disconnected from the USB port 16 of the host apparatus 10. The CPU 24 reads a program stored in the flash ROM 22 and loads the program into the RAM 25, and executes the program to control components of the storage terminal 20. The RAM 25 is a work area for the CPU 24.

Next, the configuration of the flash ROM 22 will be described in detail.

Figure 4:
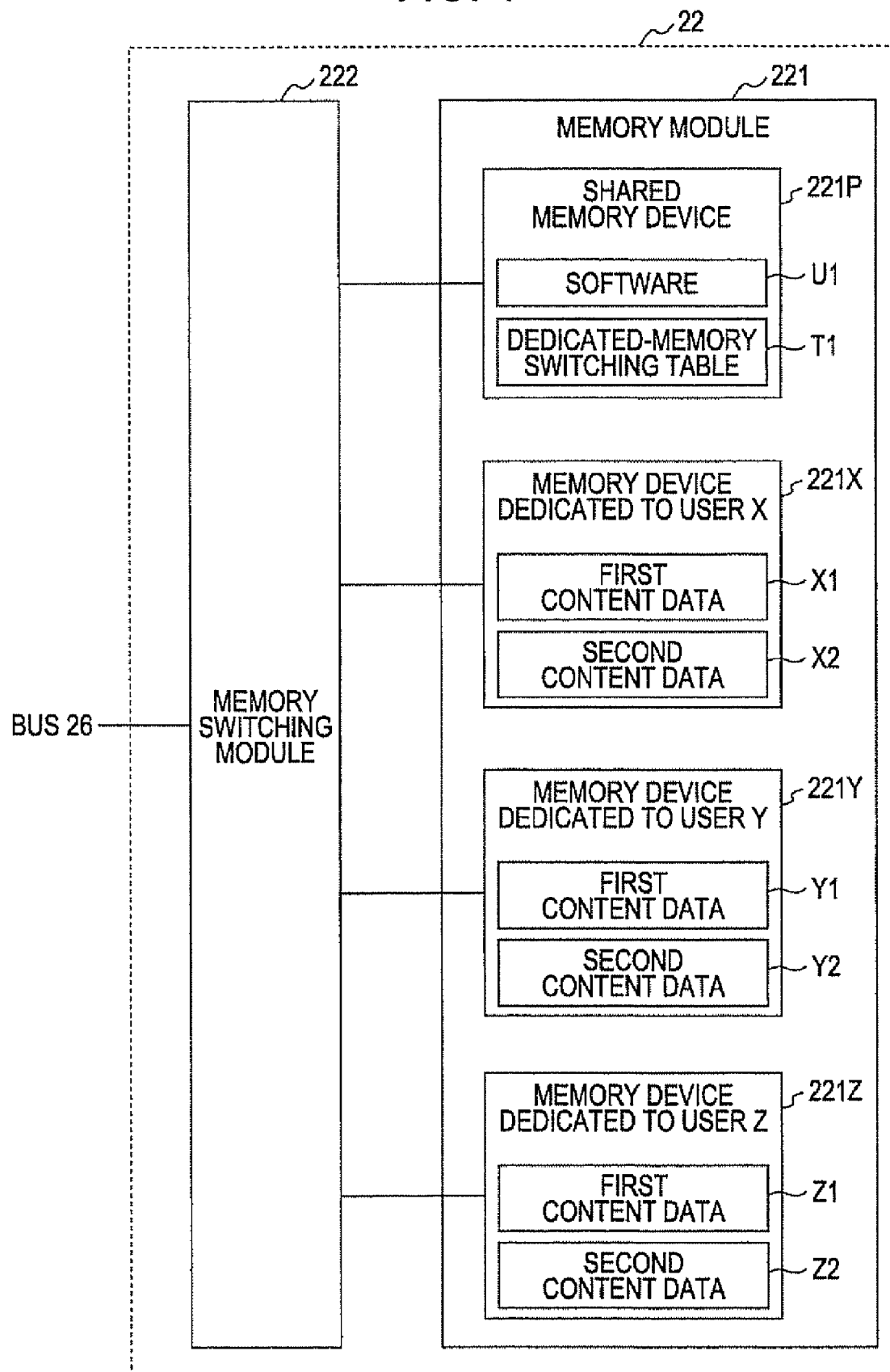
FIG. 4 is a diagram schematically showing the configuration of a flash ROM in a first embodiment.

FIG. 4 is a diagram schematically showing the configuration of the flash ROM 22. Referring to FIG. 4, the flash ROM 22 includes a memory module 221 and a memory switching module 222. The memory module 221 includes a plurality of memory devices, namely, a shared memory device 221P, a memory device 221X dedicated to a user X, a memory device 221Y dedicated to a user Y, and a memory device 221Z dedicated to a user Z. These memory devices are connected to the memory switching module 222. The shared memory device 221P has a storage area that can be used by all users of the host apparatus 10. On the other hand, each of the memory device 221X dedicated to the user X, the memory device 221Y dedicated to the user Y, and the memory device 221Z dedicated to the user Z has a storage area that can be used only by the corresponding user. In the following description, the memory device 221X dedicated to the user X, the memory device 221Y dedicated to the user Y, and the memory device 221Z dedicated to the user Z will be collectively referred to as user-dedicated memory devices when particular distinction is not needed among these memory devices.

The user-dedicated memory devices have individually different memory identifiers assigned thereto for individual identification. For example, the memory device 221X dedicated to the user X has a memory identifier "memID01" assigned thereto, the memory device 221Y dedicated to the user Y has a memory identifier "memID02" assigned thereto, and the memory device 221Z dedicated to the user Z has a memory identifier "memID03" assigned thereto.

Furthermore, the user-dedicated memory devices have individually different communication addresses assigned thereto, which are usually used on a network. In this embodiment, the IP addresses based on IPv6, used on the Internet, are assigned to the individual user-dedicated memory devices. For example, the memory device 221X dedicated to the user X has assigned thereto an IP address "x.x.x.x.10.20.1.1", the memory device 221Y dedicated to the user Y has assigned thereto an IP address "x.x.x.x.10.20.1.2", and the memory device 221Z dedicated to the user Z has assigned thereto an IP address "x.x.x.x.10.20.1.3".

Next, what is stored in each of the memory devices will be described. The shared memory device 221P stores software U1 and a dedicated-memory switching table T1. The software U1 includes a plurality of programs for controlling components of the storage terminal 20. FIG. 5 is a diagram showing a hierarchical structure of the software U1. Referring to FIG. 5, the software U1 has a hierarchical structure including hardware, an operating system (OS), a USB control program, a Mass Storage Class driver, a Communication Class driver, a TCP/IP protocol stack, and a WWW server program (Internet server program), in that order from lower to higher layers.

The OS is a program that generally manages various functions of the hardware, such as input/output and storage. The USB control program is a program that runs on the OS so that data can be exchanged according to the USB standard. The Mass Storage Class driver is a program for exchanging information according to the Mass Storage Class. The Mass Storage Class serves as a read/write standard according to which the CPU 11 of the host apparatus 10 reads information from or writes information to the flash ROM 22. The Communication Class driver is a program for exchanging information according to the Communication Class. The Communication Class serves as a communication standard according to which the storage terminal 20 exchanges information. The Communication Class driver carries out communications using one of a plurality of IP addresses assigned in advance to the storage terminal 20, such as "x.x.x.x.10.20.1.1", "x.x.x.x.10.20.1.2", and "x.x.x.x.10.20.1.3". The TCP/IP protocol stack is software supporting a set of protocols used for carrying out communications according to TCP/IP, which is a protocol suite used for communications over the Internet. The WWW server program is a program for providing Web content. By executing the WWW server program, upon receiving a request from the host apparatus 10 (WWW client), processing is executed according to the program.

The dedicated-memory switching table T1 is a table for identifying a memory identifier associated with an IP address sent from the host apparatus 10. FIG. 6 is a diagram showing an example of the dedicated-memory switching table T1. Referring to FIG. 6, in the dedicated-memory switching table T1, each of a plurality of memory identifiers assigned in advance to the individual user-dedicated memory devices is associated with one of a plurality of IP addresses assigned to the storage terminal 20. In the example shown in FIG. 6, an IP address "x.x.x.x.10.20.1.1" is associated with a memory identifier "memID01", an IP address "x.x.x.x.10.20.1.2" is associated with a memory identifier "memID02", and an IP address "x.x.x.x.10.20.1.3" is associated with a memory identifier "memID03".

Referring back to FIG. 4, the memory device 221X dedicated to the user X stores first content data X1 and second content data X2. The first content data X1 is written in a markup language, such as HTML, and information corresponding to the first content data X1 is displayed according to a procedure defined in the Web browser program B (Internet browser program) stored in the host apparatus 10. The second content data X2 is data that is output according to a procedure defined in a program different from the Web browser program B. For example, the second content data X2 includes one or more of data of music that is played back according to a procedure defined in a music processing program, data of an image that is displayed according to a procedure defined in an image processing program, or data of a document that that is displayed according to a procedure defined in a document processing program. The first content data X1 is file-management-page data for providing a Web page for management of the second content data X2.

The memory device 221Y dedicated to the user Y stores first content data Y1 and second content data Y2. Similarly to the memory device 221X dedicated to the user X described above, in the memory device 221Y dedicated to the user Y, file-management-page data for providing a Web page for management of the second content data Y2 is stored as the content data Y1. Furthermore, the memory device 221Z dedicated to the user Z stores first content data Z1 and second content data Z2. Similarly to the above, in the memory device 221Z dedicated to the user Z, file-management-page data for providing a Web page for management of the second content data Z2 is stored as the first content data Z1.

The memory switching module 222 maintains the shared memory device 221P and the bus 26 constantly in connection with each other via a data transmission path. Furthermore, the memory switching module 222 connects a user-dedicated memory device specified by the CPU 24 with the bus 26 via a data transmission path while disconnecting the other user-dedicated memory devices from the bus 26. The CPU 24 instructs the memory switching module 222 to switch connection, on the basis of a memory identifier identified with reference to the dedicated-memory switching table T1 stored in the shared memory device 221P. For example, when the memory identifier "memID01" is identified by the CPU 24 with reference to the dedicated-memory switching table T1 shown in FIG. 6, the CPU 24 instructs switching of connection with a specification of the memory device 221X dedicated to the user X, which has the memory identifier "memID01" assigned thereto. The memory switching module 222 connects the memory device 221X dedicated to the user X, specified by the CPU 24, with the bus 26, and disconnects the memory device 221Y dedicated to the user Y and the memory device 221Z dedicated to the user Z from the bus 26. Thus, a user of the host apparatus 10 is allowed to access the memory device 221X dedicated to the user X, which is connected to the bus 26 by the memory switching module 222. However, this user is not allowed to access the memory device 221Y dedicated to the user Y and the memory device 221Z dedicated to the user Z, which are disconnected from the bus 26.

(2) Operation

Next, an operation in this embodiment will be described with reference to a sequence diagram shown in FIG. 7.

In the operation in this embodiment, it is presupposed that each user of the host apparatus 10 knows in advance a uniform resource locator (URL) corresponding to a user-dedicated memory device dedicated to the user. In the following description, it is assumed that the memory device 221X dedicated to the user X is used as a storage area dedicated to the user X, and that the URL corresponding to the memory device 221X dedicated to the user X is "http://x.x.x.x.10.20.1.1/usb/index.html". In the URL, the IP address assigned to the memory device 221X dedicated to the user X is included as a host name. Thus, a domain name system (DNS) for translating a host name in the URL into an IP address is not needed. Similarly, it is assumed that the memory device 221Y dedicated to the user Y is used as a storage area dedicated to the user Y, and that the URL corresponding to the memory device 221Y dedicated to the user Y is "http://x.x.x.x.10.20.1.2/usb/index.html". Furthermore, it is assumed that the memory device 221Z dedicated to the user Z is used as a storage area dedicated to the user Z, and that the URL corresponding to the memory device 221Z dedicated to the user Z is "http://x.x.x.x.10.20.1.3/usb/index.html". That is, each user can access a user-dedicated memory device dedicated to the user by specifying a URL including an IP address specific to the user.

Figure 8:
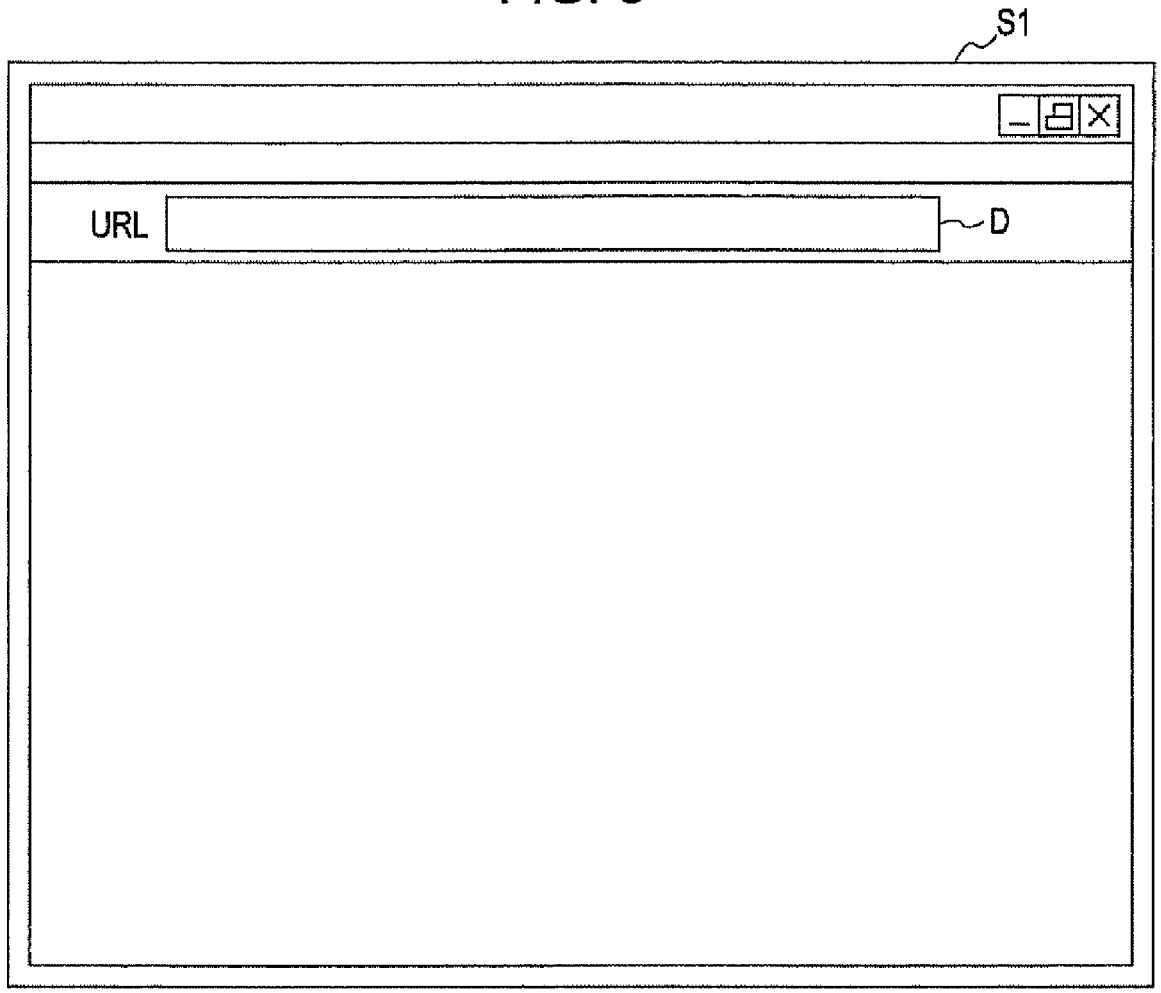
FIG. 8 is an illustration of a Web-browser screen.

For example, when the user X has instructed activation of a Web browser by an operation of the operating unit 17 of the host apparatus 10, the CPU 11 executes the Web browser program B stored in the storage unit 14 to display a Web-browser screen S1 shown in FIG. 8 on the display 18 (step S100). As described above, when the user X accesses the memory device 221X dedicated to the user X, the user X specifies the URL "http://x.x.x.x.10.20.1.1/usb/index.html". When the user X has input the URL "http://x.x.x.x.10.20.1.1/usb/index.html" in an address bar D of the Web-browser screen S1 by an operation of the operating unit 17, the CPU 11 sends a request for obtaining the first content data X1, stored at the location indicated by the input URL, to the storage terminal 20 using the USB controller 15 (step S110). In this example, since file-management-page data is stored as the first content data X at the location indicated by the URL "http://x.x.x.x.10.20.1.1/usb/index.html", a request for obtaining this file-management-page data is sent to the storage terminal 20.

Figure 9:
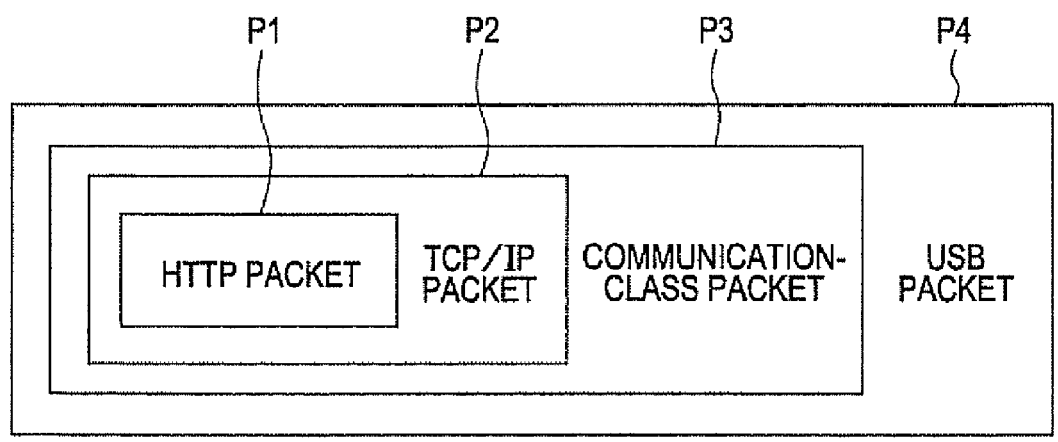
FIG. 9 is a diagram showing a request that is sent in step S110.

FIG. 9 is a diagram showing a request that is sent from the USB controller 15 to the storage terminal 20 in step S110. The request is generated by the CPU 11 in the following manner. First, an HTTP packet P1 for obtaining the file-management-page data is generated using a "get" command. The HTTP packet P1 includes the input URL "http://x.x.x.x.10.20.1.1/usb/index.html". Then, the HTTP packet P1 is encapsulated according to TCP/IP to form a TCP/IP packet P2. Furthermore, the TCP/IP packet P2 is encapsulated according to the Communication Class to form a Communication Class packet P3. Furthermore, the Communication Class packet P3 is encapsulated according to the USB standard to form a USB packet P4. As a result of these encapsulating steps, the request has a hierarchical structure.

The CPU 24 of the storage terminal 20 receives the request sent from the USB controller 15, using the USB controller 21 (step S120 shown in FIG. 7). Then, the CPU 24 decapsulates the received request according to the USB standard, the Communication Class, and TCP/IP, in that order, to extract the HTTP packet P1. Then, the CPU 24 extracts a host name from the URL included in the HTTP packet P1 to obtain an IP address. In this example, the CPU 24 obtains an IP address "x.x.x.x.10.20.1.1" included in the URL "http://x.x.x.x.10.20.1.1/usb/index.html".

Then, with reference to the dedicated-memory switching table T1 stored in the shared memory device 221P, the CPU 24 identifies a memory identifier associated with the IP address that has been obtained. Then, the CPU 24 causes the memory switching module 222 to connect a user-dedicated memory device having the identified memory identifier assigned thereto with the bus 26 (step S130). In this example, a memory identifier "memID01", which is associated with the IP address "x.x.x.x.10.20.1.1" in the dedicated-memory switching table T1 shown in FIG. 6, is identified. Thus, the memory switching module 222 connects the memory device 221X dedicated to the user X, which has the memory identifier "memID01" assigned thereto, with the bus 26, Furthermore, the memory switching module 222 disconnects the memory device 221Y dedicated to the user Y and the memory device 221Z dedicated to the user Z, which have assigned thereto memory identifiers different from the identified memory identifier "memID01", from the bus 26. That is, the user X is allowed to access the memory device 221X dedicated to the user X, but is not allowed to access the memory device 221Y dedicated to the user Y or the memory device 221Z dedicated to the user Z.

Then, the CPU 24 reads the file-management-page data as the first content data X1, specified by the URL included in the extracted HTTP packet P1, from the memory device 221X dedicated to the user X connected by the memory switching module 222 (step S140). Then, the CPU 24 sends a response including the file-management-page data from the USB controller 21 to the host apparatus 10 according to the Communication Class (step S150).

Figure 10:
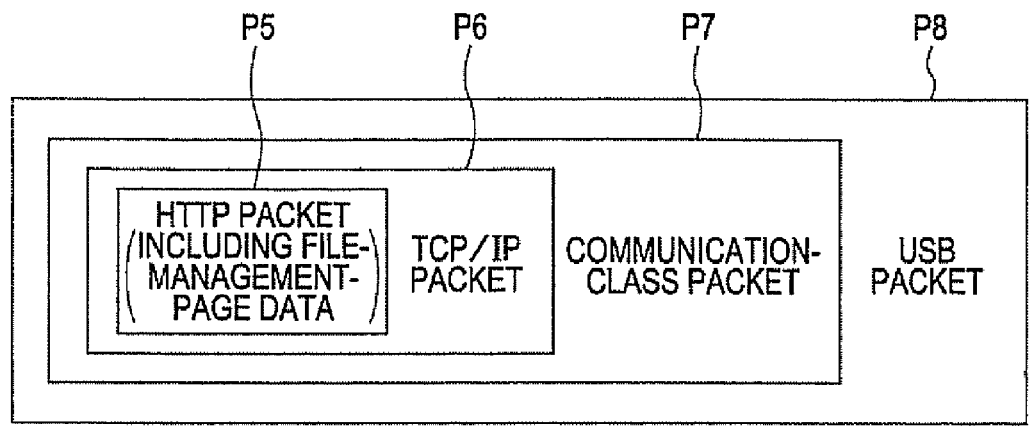
FIG. 10 is a diagram showing a response that is sent in step S150.

FIG. 10 is a diagram showing the response that is sent from the USB controller 21 to the host apparatus 10 in step S150. The response is generated in the following manner. First, an HTTP packet P5 for responding to the request that has been sent is generated using a "response" command. The HTTP packet P5 includes the file-management-page data that has been read. Similarly to the HTTP packet P1 described earlier, the HTTP packet P5 is encapsulated in a hierarchical manner.

That is, the response includes the HTTP packet P5, a TCP/IP packet P6, a Communication Class packet P7, and a USB packet P8 in a hierarchical structure.

The CPU 11 of the host apparatus 10 receives the response sent from the USB controller 21, using the USB controller 15 (step S160 shown in FIG. 7). Then, the CPU 11 decapsulates the response according to the USB standard, the Communication Class, and TCP/IP, in that order, to extract the HTTP packet P5. Then, the CPU 11 displays a file-management-page screen S2 shown in FIG. 11 on the display 18 on the basis of the file-management-page data included in the HTTP packet P5 (step S170). The file-management-page screen S2 is displayed on the basis of the file-management-page data according to a procedure defined in the Web browser program B stored in the storage unit 14.

Now, the file-management-page screen S2 will be described. In the file-management-page screen S2, a local file list I1, a storage-terminal file list I2, and transfer buttons B1 and B2 for instructing data transfer are provided. The local file list I1 is a list of property information of individual pieces of the content data C stored in the storage unit 14 of the host apparatus 10, including names, types, and dates and times of last update. The property information can be obtained by the CPU 11. In the example shown in FIG. 11, the local file list I1 includes "Folder1", "Folder2", "Folder3", and "text1.txt" as names of individual pieces of the content data C. The storage-terminal file list I2 is a list of property information of individual pieces of the second content data X2 stored in the memory device 221X dedicated to the user X, including names, types, and dates and times of last update. In the example shown in FIG. 11, the storage-terminal file list I2 includes "USBFolder1", "USBFolder2", "USBFolder3", and "text1.txt" as names of individual pieces of the second content data X2. As for the second content data Y2 and the second content data Z2 stored in the memory device 221Y dedicated to the user Y and the memory device 221Z dedicated to the user Z, disconnected from the bus 26 by the memory switching module 222 in step S130 described earlier, property information is not displayed in the storage-terminal file list I2. The transfer button B1 is a button used to instruct that a piece of the content data C identified by a name included in the local file list I1 be transferred to the memory device 221X dedicated to the user X of the storage terminal 20. The transfer button B2 is a button used to instruct that a piece of the second content data X2 identified by a name included in the storage-terminal file list I2 be transferred to the storage unit 14 of the host apparatus 10.

Now, an example will be considered where the user X has specified the piece of the second content data X2 having the name "USBFolder1" in the storage-terminal file list I2 by an operation of the operating unit 17 and then pressed the transfer button B2. Then, the CPU 11 sends a request for obtaining the piece of the second content data X2 having the name "USBFolder1" to the storage terminal 20, using the USB controller 15 (step S180 shown in FIG. 7). The request is generated by hierarchically encapsulating an HTTP packet for obtaining the piece of the second content data X2 having the name "USBFolder1", similarly to the request shown in FIG. 9.

The CPU 24 of the storage terminal 20 receives the request sent from the USB controller 15, using the USE controller 21 (step S190). Then, the CPU 24 decapsulates the request to extract the HTTP packet, and reads the piece of the second content data X2 having the name "USBFolder1", specified by the HTTP packet as content data to be obtained, from the memory device 221X dedicated to the user X connected to the bus 26 (step S200). Then, the CPU 24 sends transfer information including the piece of the second content data X2 having the name "USBFolder1" from the USE controller 21 to the host apparatus 10 according to the Mass Storage Class (step S210).

Figure 12:
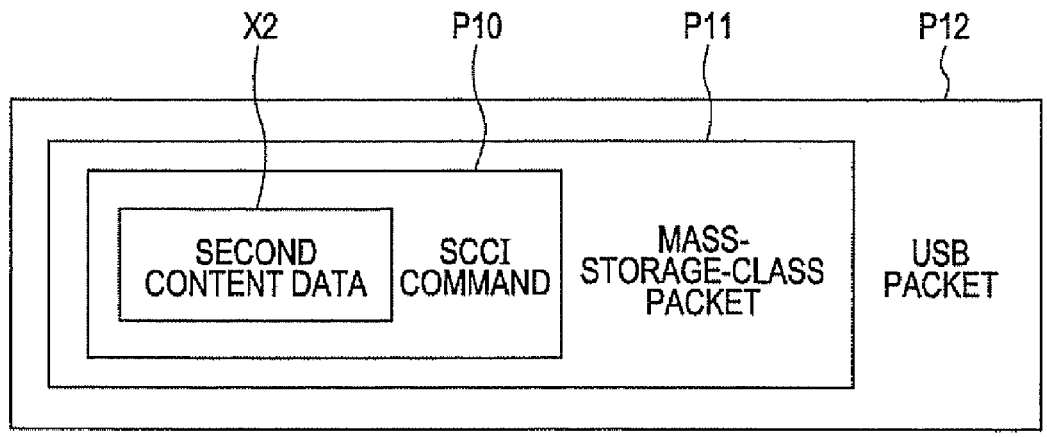
FIG. 12 is a diagram showing information to be transferred, sent in step S210.

FIG. 12 is a diagram showing the transfer information sent from the USE controller 21 to the host apparatus 10 in step S210. First, a SCSI (Small Computer System Interface) command P10 is attached to the piece of the second content data X2 having the name "USBFolder1" and read in step S200, and the resulting data is encapsulated according to the Mass Storage Class, whereby a Mass Storage Class packet P11 is generated. Furthermore, the Mass Storage Class packet P11 is encapsulated according to the USE standard, whereby a USB packet P12 is generated. That is, the transfer information has a hierarchical structure formed by encapsulating the piece of the second content data X2 having the name "USBFolder1" in order of the SCSI command P10, the Mass Storage Class packet P11, and the USE packet P12.

Figure 13:
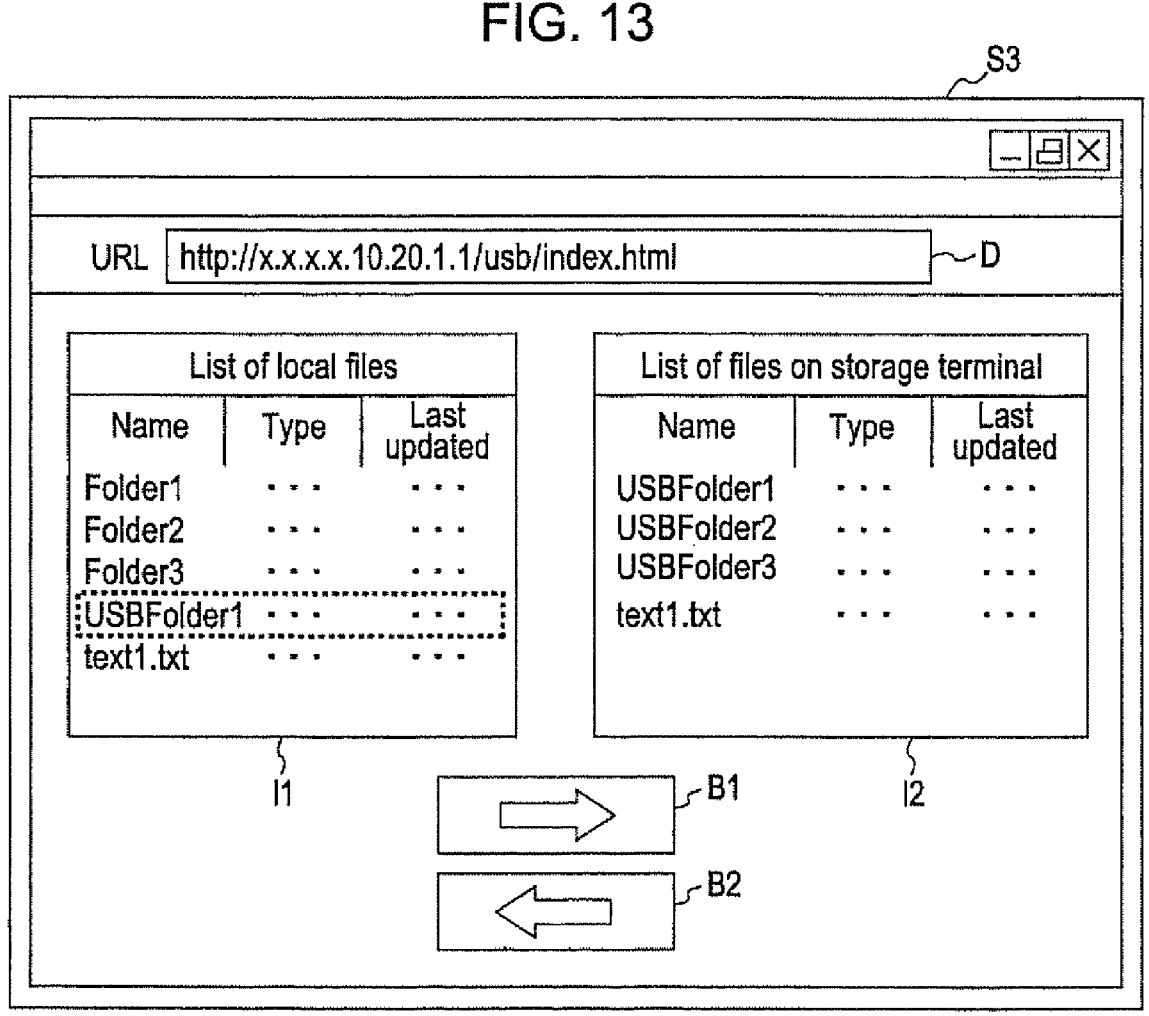
FIG. 13 is an illustration of an updated file-management-page screen.

The CPU 11 of the host apparatus 10 receives the transfer information sent from the USB controller 21, using the USB controller 15 (step S220 shown in FIG. 7). The CPU 11 decapsulates the transfer information to extract the piece of the second content data X2 having the name "USBFolder1". Then, the CPU 11 stores the piece of the second content data X2 having the name "USBFolder1" in the storage unit 14 (step S230). When the piece of the second content data X2 having the name "USBFolder1" has been transferred from the memory device 221X dedicated to the user X of the storage terminal 20 to the storage unit 14 of the host apparatus 10, the CPU 11 updates the file-management-page screen (step S240). FIG. 13 is an illustration showing an updated file-management-page screen S3. Referring to FIG. 13, in the local file list I1 in the file-management-page screen S3, property information of the piece of the second content data X2 having the name "USBFolder1", including a name, a type, and a date and time of last update, is additionally included.

The above description deals with a case where information is downloaded from the storage terminal 20 acting as a WWW server to the host apparatus 10 acting as a WWW client. In contrast, the following description deals with a case where information is uploaded from the host apparatus 10 acting as a WWW client to the storage terminal 20 acting as a WWW server.

Figure 11:
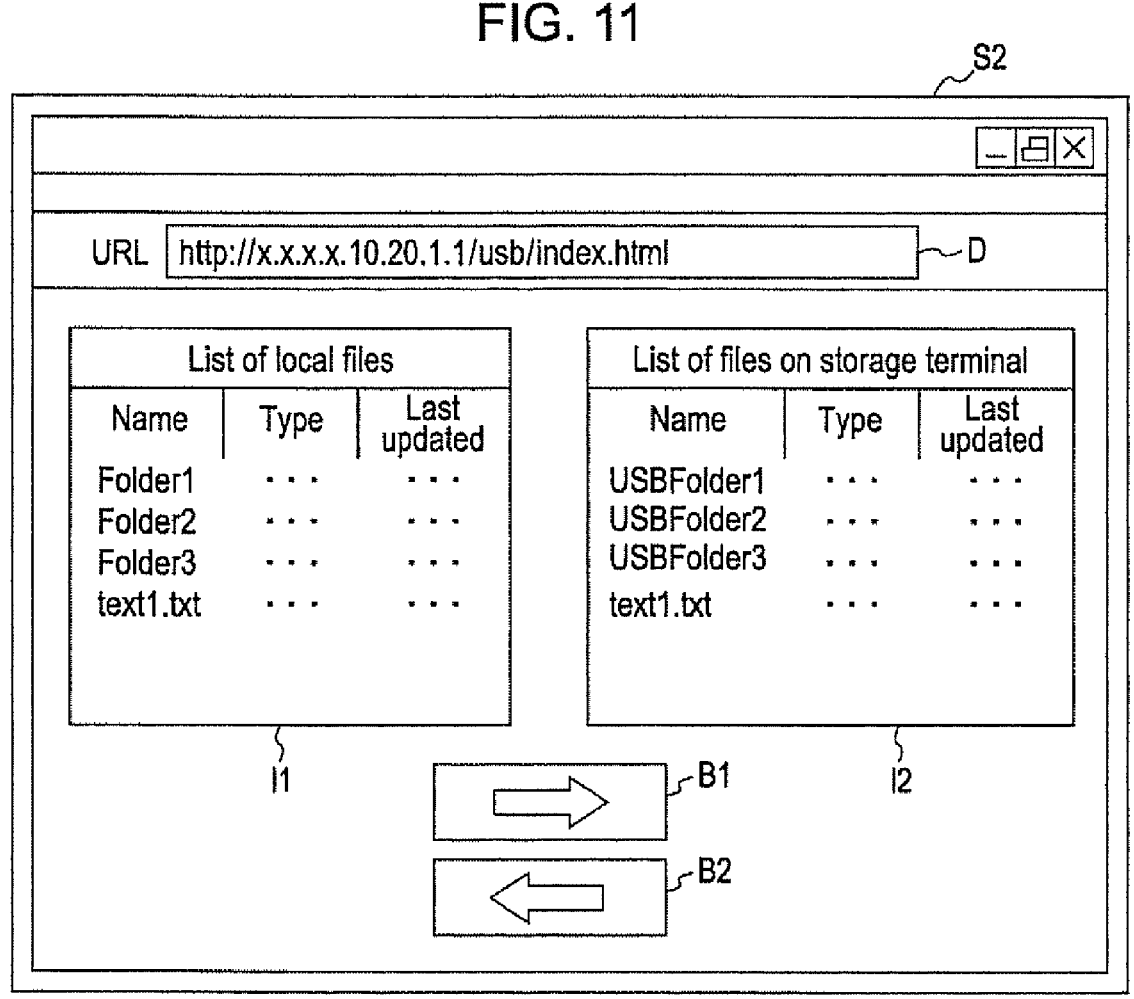
FIG. 11 is an illustration of a file-management-page screen.

Now, an example will be considered where the user X has specified the piece of the content data C having the name "Folder1" in the local file list I1 by an operation of the operating unit 17 and then pressed the transfer button B1 in the file-management-page screen S2 shown in FIG. 11. Then, the CPU 11 reads the piece of the content data C having the specified name "Folder1" from the storage unit 14, and generates an HTTP packet including the piece of the content data C using a "post" command. Furthermore, the CPU 11 encapsulates the HTTP packet according to TCP/IP, encapsulates the resulting TCP/IP packet according to the Mass Storage Class, and encapsulates the resulting Mass Storage Class packet according to the USB standard. The CPU 11 sends the resulting USB packet from the USB controller 15 to the storage terminal 20 as transfer information.

The CPU 24 of the storage terminal 20 receives the transfer information including the piece of the content data C, using the USB controller 21. The CPU 24 decapsulates the transfer information to extract the piece of the content data C having the name "Folder1". Then, the CPU 24 stores the piece of the content data C having the name "Folder1" in the memory device 221X dedicated to the user X connected to the bus 26.

In this manner, information is uploaded from the host apparatus 10 acting as a WWW client to the storage terminal 20 acting as a WWW server.

Furthermore, similarly to the case described earlier, the user Y can access the memory device 221Y dedicated to the user Y by specifying a URL "http://x.x.x.x.10.20.1.2/usb/index.html". Thus, the user Y can download information from or upload information to the memory device 221Y dedicated to the user Y dedicated to the user Y. Similarly, the user Z can access the memory device 221Z dedicated to the user Z to download information therefrom or upload information thereto by specifying a URL "http://x.x.x.x.10.20.1.3/usb/index.html".

According to the first embodiment described above, user management can be exercised individually for each user-dedicated memory device of the storage terminal 20. Thus, even when the single storage terminal 20 is commonly used by a plurality of users, data of a user, stored in the storage terminal 20, is not browsed or tampered with by other users.

Furthermore, as described above, the CPU 24 of the storage terminal 20 acting as a WWW server executes a program for sending first content data or transferring second content data. That is, the host apparatus 10 that receives the first content data or the second content data need not execute a program for obtaining the content data. Thus, the process described above can be executed regardless of the type of OS running on the host apparatus 10. Furthermore, unauthorized users or programs on the side of the host apparatus 10 are prohibited from tampering with or intercepting content data stored on the storage terminal 20. This serves to enhance security.

Second Embodiment

Next, a second embodiment will be described.
(1) Configuration

Figure 14:
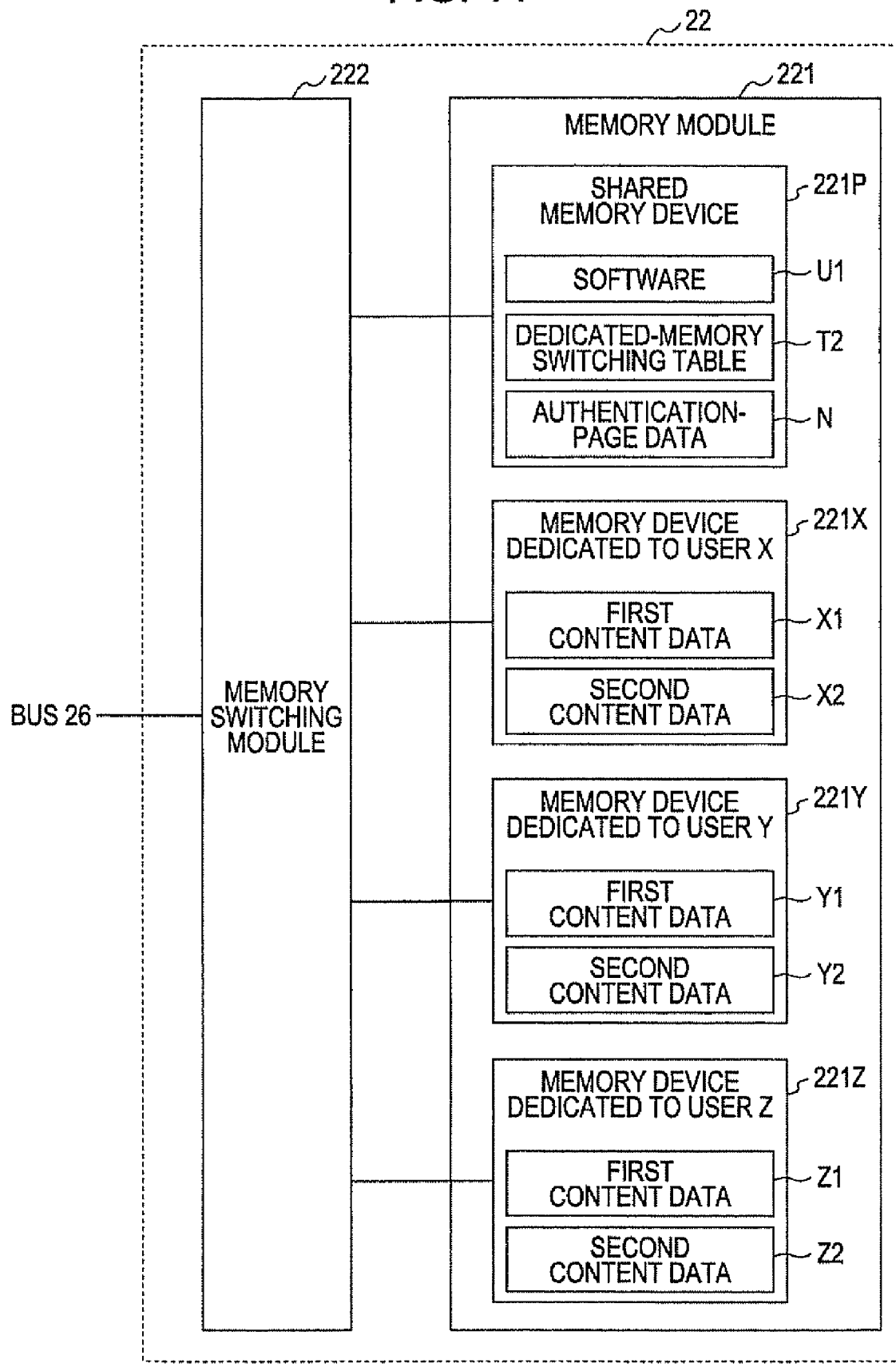
FIG. 14 is a diagram schematically showing the configuration of a flash ROM in a second embodiment.

The configuration of a host apparatus 10 in the second embodiment is the same as that in the first embodiment shown in FIG. 2, so that description thereof will be omitted. Furthermore, the configuration of a storage terminal 20 in the second embodiment is the same as that in the first embodiment shown in FIG. 3, except what is stored in the flash ROM 22. FIG. 14 is a diagram schematically showing the configuration of the flash ROM 22 in the second embodiment. Referring to FIG. 14, the shared memory device 221P of the flash ROM 22 stores a dedicated-memory switching table T2 and authentication-page data N in addition to the software U1 described earlier. The authentication-page data N is data for providing a Web page for user authentication, and is written in a markup language, such as HTML, similarly to the first content data described earlier.

Figure 15:
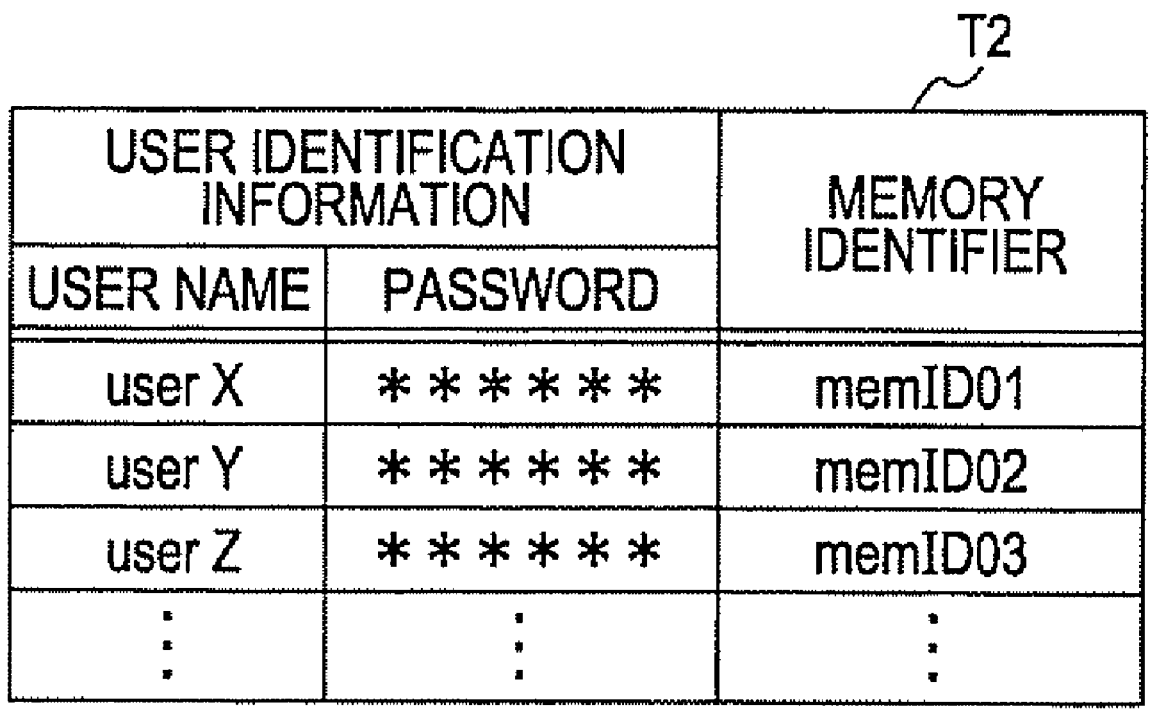
FIG. 15 is a diagram showing an example of a dedicated-memory switching table.

The dedicated-memory switching table T2 is a table for identifying a memory identifier associated with user identification information sent from the host apparatus 10. FIG. 15 is a diagram showing an example of the dedicated-memory switching table T2. Referring to FIG. 15, in the dedicated-memory switching table T2, user identification information assigned to each user of the host apparatus 10 is associated with a memory identifier of a user-dedicated memory device dedicated to the user identified by the user identification information. In the example shown in FIG. 15, a combination of a user name and a password is used as user identification information. For example, a combination of a user name "userX" and a password, assigned to the user X, is associated with a memory identifier "memID01". Furthermore, a combination of a user name "userY" and a password, assigned to the user Y, is associated with a memory identifier "memID02". Furthermore, a combination of a user name "userZ" and a password, assigned to the user Z, is associated with a memory identifier "memID03".

(2) Operation

Figure 16:
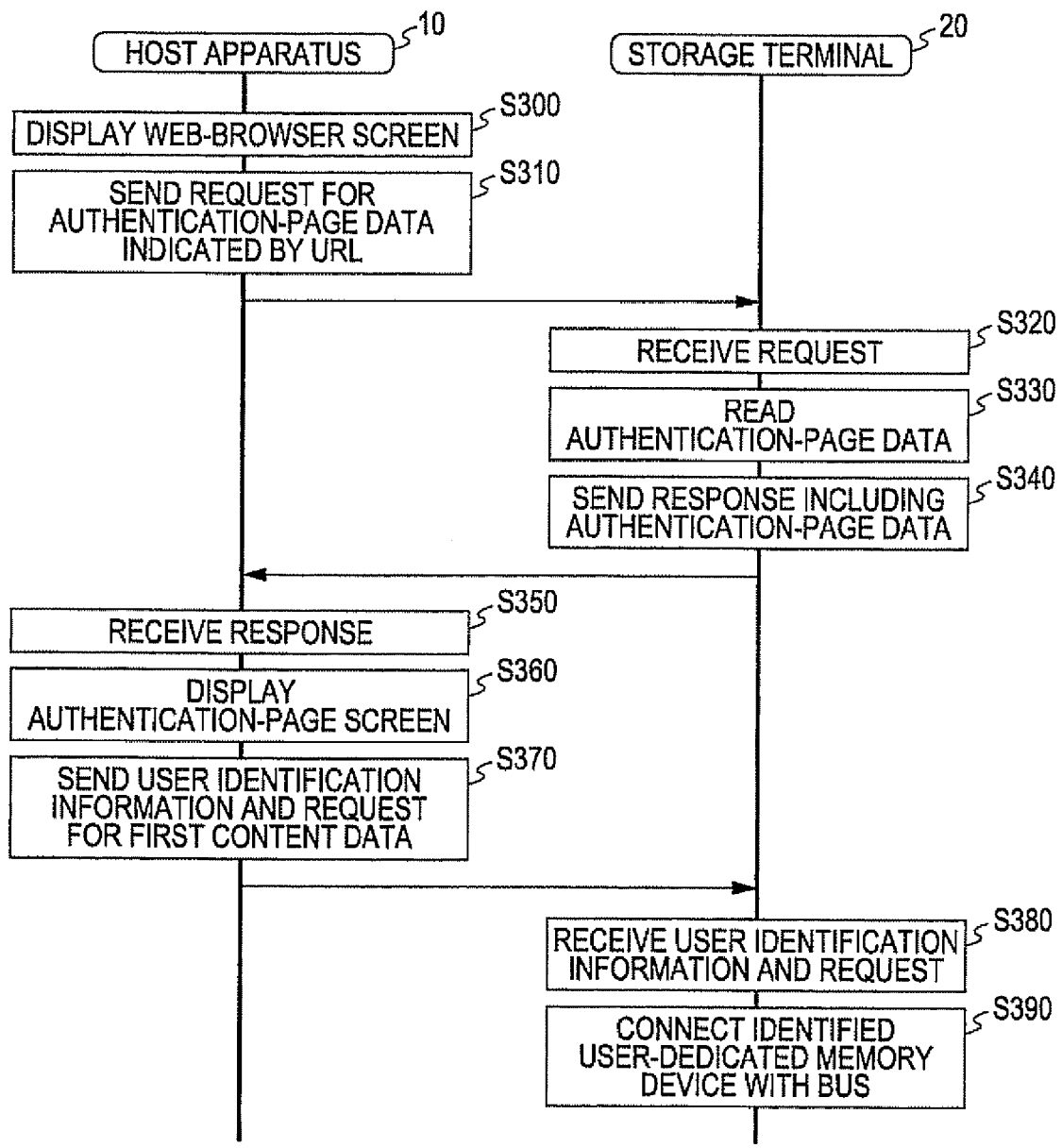
FIG. 16 is a sequence diagram showing an operation in the second embodiment.

Next, an operation in the second embodiment will be described with reference to a sequence diagram shown in FIG. 16.

In the operation in the second embodiment, it is presupposed that each user of the host apparatus 10 knows in advance a URL of an authentication page for user authentication. In the following description, it is assumed that the URL of the authentication page is "http://x.x.x.x.10.201.1/usb/auth.html".

For example, similarly to the case described earlier, when the user X has instructed activation of a Web browser by an operation of the operating unit 17 of the host apparatus 10, the CPU 11 executes the Web browser program B stored in the storage unit 14 to display the Web browser screen S1 shown in FIG. 8 on the display 18 (step S300). Furthermore, when the user X has input the URL "http://x.x.x.x.10.20.1.1/usb/auth.html" in the address bar D of the Web-browser screen S1 by an operation of the operating unit 17, the CPU 11 sends a request for obtaining the authentication-page data N, stored at the location indicated by the input URL, from the USB controller 15 to the storage terminal 20 according to the Communication Class (step S310).

The CPU 24 of the storage terminal 20 receives the request sent from the USB controller 15, using the USB controller 21 (step S320). Then, the CPU 24 reads the authentication-page data N specified by the request from the shared memory device 221P (step S330). Then, the CPU 24 sends a response including the authentication-page data N from the USB controller 21 to the host apparatus 10 according to the Communication Class (step S340).

Figure 17:
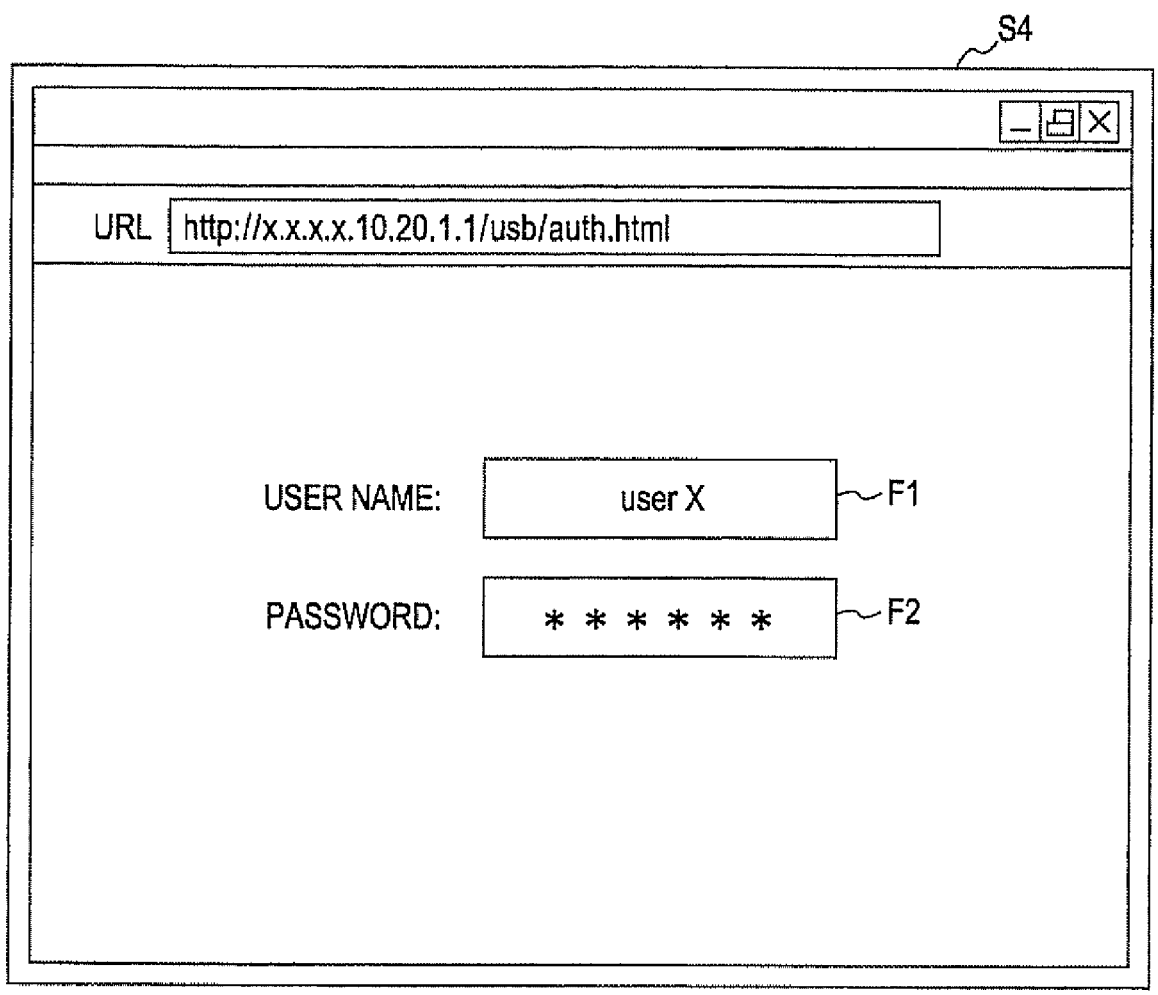
FIG. 17 is an illustration of an authentication-page screen.

The CPU 11 of the host apparatus 10 receives the response sent from the USB controller 21, using the USB controller 15 (step S350). Then, the CPU 11 displays an authentication-page screen S4 shown in FIG. 17 on the basis of the authentication-page data N included in the response (step S360). In the authentication-page screen S4, information corresponding to the authentication-page data N is displayed according to a procedure defined in the Web browser program B stored in the storage unit 14. In the authentication-page screen S4, a text field F1 for inputting a user name assigned individually to a user and a text field F2 for inputting a password individually set by the user are provided.

When the user X has input the user name "userX" assigned to the user X in the text field F1 and input a password set by the user X in the text field F2 of the authentication-page screen S4 by an operation of the operating unit 17, the CPU 11 sends user identification information including the input user name and password, and a request for obtaining first content data representing a Web page that is to be displayed next to the authentication-page screen S4, from the USB controller 15 to the storage terminal 20 according to the Communication Class (step S370).

The CPU 24 of the storage terminal 20 receives the user identification information and the request sent from the USB controller 15, using the USB controller 21 (step S380). Then, the CPU 24 identifies a memory identifier associated with the user identification information with reference to the dedicated-memory switching table T2 stored in the shared memory device 221P. In this example, the combination of "userX" and the input password is checked against the dedicated-memory switching table T2. When the combination is determined as valid, a memory identifier "memID01" associated with the combination of "userX" and the password is identified. Then, similarly to the case described earlier, the CPU 24 causes the memory switching module 222 to connect the memory device 221X dedicated to the user X having the memory identifier assigned thereto with the bus 26 (step S390). Processing that is executed after the memory device 221X dedicated to the user X is connected to the bus 26 by the memory switching module 222 is the same as processing in step S140 and the subsequent steps described regarding the first embodiment, so that detailed description thereof will be omitted.

According to the second embodiment described above, without assigning different IP addresses to individual user-dedicated memory devices of the storage terminal 20, user management can be exercised individually for each user-dedicated memory device of the storage terminal 20.

Modifications

The embodiments described above can be modified as described below. Furthermore, the following modifications may be combined as appropriate.

(1) In the embodiments described above, the storage terminal 20 acting as a WWW server and the host apparatus 10 acting as a WWW client exchange information according to the Communication Class. Alternatively, the storage terminal 20 acting as a WWW server and the host apparatus 10 acting as a WWW client may exchange information according to the Mass Storage Class. In this case, software U2 is stored in the shared memory device 221P of the storage terminal 20 instead of the software U1 described earlier.

Figure 18:
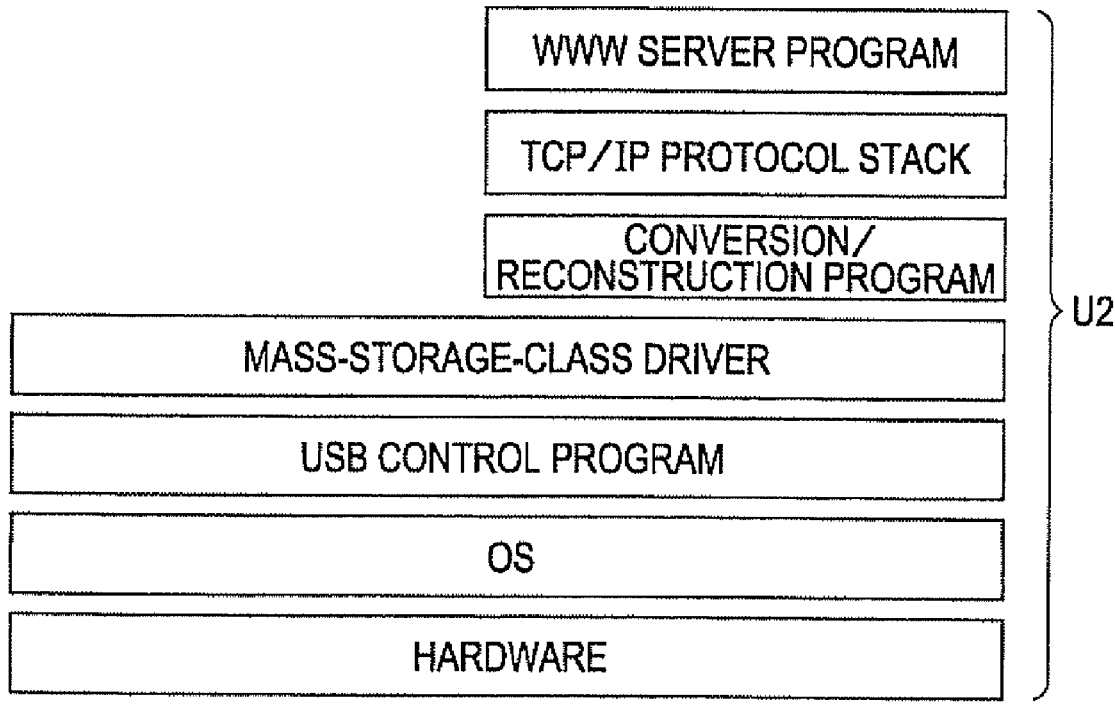
FIG. 18 is a diagram showing a hierarchical structure of software.

FIG. 18 is a diagram showing a hierarchical structure of the software U2. Referring to FIG. 18, the software U2 has a hierarchical structure including hardware, an OS, a USB control program, a Mass Storage Class driver, a conversion/reconstruction program, a TCP/IP protocol stack, and a WWW server program, in that order from lower to higher layers. The OS, the USB control program, the Mass Storage Class driver, the TCP/IP protocol stack, and the WWW server program are the same as those of the software U1 shown in FIG. 5, so that description thereof will be omitted. Upon receiving a request formed by encapsulation according to TCP/IP and encapsulation according to the Mass Storage Class, the conversion/reconstruction program decapsulates the request according to the Mass Storage Class. Furthermore, the conversion/reconstruction program encapsulates first content data according to TCP/IP, encapsulates the resulting TCP/IP packet according to the Mass Storage Class, and attaches a flag indicating that a TCP/IP packet is included in a Mass Storage Class packet.

Figure 19:
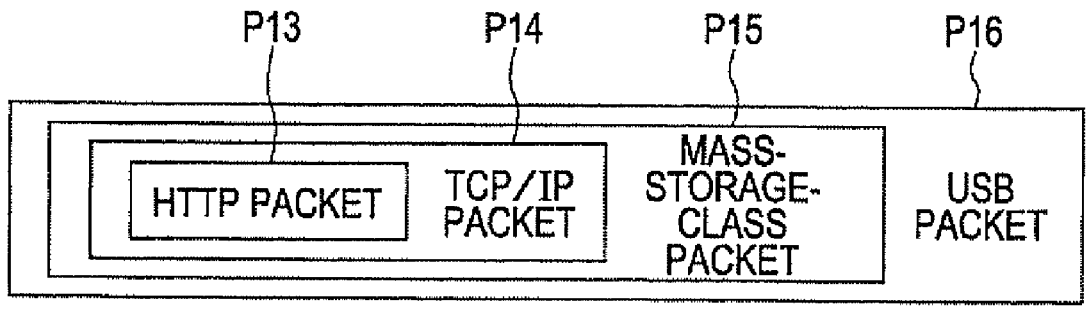
FIG. 19 is a diagram showing a response generated by a CPU in a modification.

Upon reading first content data from a user-dedicated memory device, the CPU 24 of the storage terminal 20 generates a response by encapsulating an HTTP packet including the first content data that has been read, as shown in FIG. 19. The response is generated by encapsulating an HTTP packet P13 including the first content data that has been read, according to TCP/IP, the Mass Storage Class, and the USB standard, in that order. That is, the response hierarchically includes the HTTP packet P13, a TCP/IP packet P14, a Mass Storage Class packet P15, and a USB packet P16. Furthermore, the response has attached thereto a flag indicating that the TCP/IP packet P14 is included in the Mass Storage Class packet P15.

When the CPU 11 of the host apparatus 10 has determined on the basis of the flag attached to the response sent from the USB controller 21 that the response is configured so that a TCP/IP packet is included in a Mass Storage Packet, the CPU 11 of the host apparatus 10 decapsulates the response according to the USB standard, the Mass Storage Class, and TCP/IP, in that order, to extract the HTTP packet P13. Thus, when information is distributed from the storage terminal 20 acting as a WWW server to the host apparatus 10 acting as a WWW client, a procedure for establishing communications that is executed when TCP/IP communications are carried out need not be executed. This serves to achieve high-speed communications.

Alternatively, the CPU 11 of the host apparatus 10 may send a request for obtaining first content data or second content data to the storage terminal 20 according to the Mass Storage Class.

When obtainment of first content data or second content data has been instructed by an operation by a user, the CPU 11 of the host apparatus 10 generates a request by encapsulating an HTTP packet for obtaining the content data, similarly to the case shown in FIG. 19. That is, the request is generated by encapsulating an HTTP packet for obtaining first content data or second content data, according to TCP/IP, the Mass Storage Class, and the USB standard, in that order, so that the request hierarchically includes the HTTP packet, a TCP/IP packet, a Mass Storage Class packet, and a USB packet. Furthermore, the request has attached thereto a flag indicating that a TCP/IP packet is included in a Mass Storage Class packet.

When the CPU 24 of the storage terminal 20 has determined on the basis of the flag attached to the request sent from the USB controller 15 that the request is configured so that a TCP/IP packet is included in a Mass Storage Packet, the CPU 24 of the storage terminal 20 decapsulates the request according to the USB standard, the Mass Storage Class, and TCP/IP, in that order, to extract an HTTP packet. Thus, when information is requested from the host apparatus 10 acting as a WWW client to the storage terminal 20 acting as a WWW server, a procedure for establishing communications that is executed when TCP/IP communications are carried out need not be executed. This serves to achieve high-speed communications.

(2) In the embodiments described above, the flash ROM 22 has a plurality of user-dedicated memory devices, and user management is exercised individually for each of the user-dedicated memory devices. Alternatively, the flash ROM 22 may have a single memory device logically divided into a plurality of storage areas, and user management may be exercised individually for each of the logical storage areas. In this case, in the flash ROM 22 of the storage terminal 20, an association table associating IP addresses or user identification information with information specifying storage areas, e.g., memory addresses, is stored. With reference to the association table, the CPU 24 identifies a memory address associated with an IP address or user identification that has been obtained. Furthermore, the CPU 24 accesses the storage area specified by the memory address, and executes requested processing. Thus, although the flash ROM 22 does not have a plurality of user-dedicated memory devices, user management can be exercised individually for each of the logical storage areas.

(3) In the embodiments described above, the storage terminal 20 includes the flash ROM 22 as an information storage unit. Alternatively, the storage terminal 20 may include a magnetic medium, such as a hard disk, as an information storage unit. For example, in the case of a hard disk, the storage area of the hard disk is managed in units of sectors. Thus, instead of the "memory identifiers" used in the first and second embodiments, "sector identifiers" assigned to individual sectors are used as identifiers of individual storage areas. Therefore, in the magnetic medium, an association table associating IP addresses or user identification information with information specifying storage areas of the magnetic medium, e.g., sector numbers, is stored. With reference to the association table, the CPU 24 identifies a sector number associated with an IP address or user identification information that has been obtained. Furthermore, the CPU 24 accesses the storage area specified by the sector number, and executes requested processing. Thus, when the storage terminal 20 includes a magnetic medium instead of the flash ROM 22, user management can be exercised individually for each of the storage areas of the magnetic medium.

Furthermore, the magnetic medium may include a plurality of disks, and user management may be exercised individually for each of the disks. In this case, in the magnetic medium, an association table associating IP addresses or user identification information with disk identifiers for identifying individual disks is stored. With reference to the association table, the CPU 24 identifies a disk identifier associated with an IP address or user identification information that has been obtained. Furthermore, the CPU 24 accesses the disk specified by the disk identifier, and executes requested processing.

(4) In the embodiments described above, user identification information includes a user name and a password. Without limitation to a user name and a password, user identification may be, for example, a user name alone, or biometric information obtained from a fingerprint, an iris, or the like.

(5) In the embodiments described above, the CPU 11 of the host apparatus 10 issues an information uploading or downloading request to the storage terminal 20. However, the CPU 11 may issue requests for other types of processing to the storage terminal 20. For example, the CPU 11 may issue a request for changing the size of a storage area in the storage terminal 20, a request for freeing a storage area, or the like to the storage terminal 20. That is, the CPU 11 may issue requests for any processing that is executed for a storage area on an individual basis.

(6) In the embodiments described above, a USB memory is used as an example of the storage terminal 20. Alternatively, the storage terminal 20 may be, for example, a digital camera equipped with a memory card.

(7) The embodiments have been described above in the context of examples where first content data is file-management-page data for providing a page for file management. However, without limitation to the page for file management, content provided by first content data may be, for example, content for providing map information, content for providing music information, or content for providing Web mail.

(8) In the embodiments described above, the CPU 11 executes the Web browser program B in response to a user's operation for instructing activation of a Web browser. Alternatively, the CPU 11 may execute the Web browser program B in response to detection of connection of the USB connector 23 with the USB port 16 of the host apparatus 10. This saves the user the task of instructing activation of a Web browser by an operation of the operating unit 17.

(9) Furthermore, at the time of activation of a Web browser, the CPU 11 may display a Web page defined in advance as a page that is to be displayed first. For example, assuming that an authentication page is defined as a page that is to be displayed first, when executing the Web browser program B, the CPU 11 obtains authentication-page data N for providing the authentication page, similarly to the case described earlier. Then, when activating a Web browser, the CPU 11 displays the authentication page on the basis of the authentication-page data N. This saves the user the task of inputting a URL by an operation of the operating unit 17.

(10) A program that is executed by the CPU 24 of the storage terminal 20 or the CPU 11 of the host apparatus 10 can be provided as recorded on recording medium, such as a magnetic tape, a magnetic disk, a flexible disk, an optical recording medium, a magneto-optical recording medium, a compact disk (CD), a digital versatile disk (DVD), or a RAM.

What is claimed is:

1. A storage terminal comprising:
    an information storage unit that includes a plurality of storage areas having individually different identifiers assigned thereto;
    an association storage unit that stores the identifiers individually in association with different communication addresses on a network;
    a receiving unit that receives a request including one of the communication addresses;
    a processing unit that identifies an identifier associated with the communication address included in the request with reference to the association storage unit and that executes processing according to the request on a storage area having the identified identifier assigned thereto; and
    a sending unit that sends information to a client apparatus on which an Internet browser program is executed;
    wherein each of the storage areas stores first information and second information, the first information being information that is displayed according to a procedure defined in the Internet browser program, and the second information being information that is output according to a procedure defined in a program different from the Internet browser program,
    wherein the receiving unit receives a request sent from the client apparatus,
    wherein the processing unit executes processing according to the request received from the client apparatus by executing an Internet server program,
    wherein when the request received from the client apparatus by the receiving unit is a request specifying the first information, the processing unit reads the specified first information from the storage area having the identified identifier assigned thereto, and sends the specified first information from the sending unit to the client apparatus according to a communication standard for exchange of information by the storage terminal, and
    wherein when the request received from the client apparatus by the receiving unit is a request specifying the second information, the processing unit reads the specified second information from the storage area having the identified identifier assigned thereto, and sends the specified second information from the sending unit to the client apparatus according to a read/write standard for reading information from or writing information to the information storage unit.

2. The storage terminal according to claim 1,
    wherein the read/write standard for reading information from or writing information to the information storage unit is a Mass Storage Class.

3. The storage terminal according to claim 1, further comprising:
    a connection switching unit that connects the processing unit via a data transmission path with the storage area having the identified identifier assigned thereto, while not connecting the processing unit via a data transmission path with the storage area or areas having assigned thereto the identifier or identifiers other than the identified identifier;
    wherein the processing unit executes the processing according to the request on the storage area connected by the connection switching unit via the data transmission path.

4. The storage terminal according to claim 1,
wherein the communication standard for exchange of information by the storage terminal is a Communication Class, and
wherein the read/write standard for reading information from or writing information to the information storage unit is a Mass Storage Class.

5. The storage terminal according to claim 1,
wherein the receiving unit and the sending unit exchange the request received from the client apparatus or information to the client apparatus according to a Universal Serial Bus standard.

6. A storage terminal comprising:
an information storage unit that includes a plurality of storage areas having individually different identifiers assigned thereto;
an association storage unit that stores the identifiers in association with pieces of user identification information individually assigned to a plurality of users;
a receiving unit that receives a request including one of the pieces of user identification information from a client apparatus on which an Internet browser program is executed;
a sending unit that sends information to the client apparatus; and
a processing unit that identifies an identifier associated with the piece of user identification information included in the request with reference to the association storage unit and that executes processing according to the request on a storage area having the identified identifier assigned thereto;
wherein each of the storage areas stores first information and second information, the first information being information that is displayed according to a procedure defined in the Internet browser program, and the second information being information that is output according to a procedure defined in a program different from the Internet browser program,
wherein the receiving unit receives the request sent from the client apparatus,
wherein the processing unit executes processing according to the request by executing an Internet server program,
wherein when the request received from the client apparatus by the receiving unit is a request specifying the first information, the processing unit reads the specified first information from the storage area having the identified identifier assigned thereto, and sends the specified first information from the sending unit to the client apparatus according to a communication standard for exchange of information by the storage terminal, and
wherein when the request received from the client apparatus by the receiving unit is a request specifying the second information, the processing unit reads the specified second information from the storage area having the identified identifier assigned thereto, and sends the specified second information from the sending unit to the client apparatus according to a read/write standard for reading information from or writing information to the information storage unit.

7. A storage terminal comprising:
an information storage unit that includes a plurality of storage areas having individually different identifiers assigned thereto;
an association storage unit that stores the identifiers in association with pieces of user identification information individually assigned to a plurality of users;
a receiving unit that receives a request including one of the pieces of user identification information from a client apparatus on which an Internet browser program is executed;
a sending unit that sends information to the client apparatus; and
a processing unit that identifies an identifier associated with the piece of user identification information included in the request with reference to the association storage unit and that executes processing according to the request on a storage area having the identified identifier assigned thereto;
wherein each of the storage areas stores first information and second information, the first information being information that is displayed according to a procedure defined in the Internet browser program, and the second information being information that is output according to a procedure defined in a program different from the Internet browser program,
wherein the receiving unit receives the request sent from the client apparatus,
wherein the processing unit executes processing according to the request by executing an Internet server program, and when the request received from the client apparatus by the receiving unit is a request specifying the first information or the second information, the processing unit reads the specified first information or second information from the storage area having the identified identifier assigned thereto, and sends the specified first information or second information from the sending unit to the client apparatus according to a communication standard a read/write standard for reading information from or writing information to the information storage unit.

8. An information processing system comprising:
a client apparatus; and
a storage terminal;
wherein the client apparatus includes:
a request sending unit that sends a request to the storage terminal, the request including one of a plurality of different communication addresses on a network; and
wherein the storage terminal includes:
an information storage unit that includes a plurality of storage areas having individually different identifiers assigned thereto;
an association storage unit that stores the identifiers individually in association with the communication addresses;
a receiving unit that receives the request sent from the client apparatus; and
a processing unit that identifies an identifier associated with the communication address included in the request with reference to the association storage unit and that executes processing according to the request on the storage area having the identified identifier assigned thereto; and
wherein a storage terminal includes:
a sending unit that sends information to the client apparatus on which an Internet browser program is executed;
wherein each of the storage areas stores first information and second information, the first information being information that is displayed according to a procedure defined in the Internet browser program, and the second information being information that is output according to a procedure defined in a program different from the Internet browser program, wherein the processing unit executes processing according to the request received from the client apparatus by executing an Internet server program, wherein when the request received from the client apparatus by the receiving unit is a request specifying the first information, the processing unit reads the specified first information from the storage area having the identified identifier assigned thereto, and sends the specified first information from the sending unit to the client apparatus according to a communication standard for exchange of information by the storage terminal, and wherein when the request received from the client apparatus by the receiving unit is a request specifying the second information, the processing unit reads the specified second information from the storage area having the identified identifier assigned thereto, and sends the specified second information from the sending unit to the client apparatus according to a read/write standard for reading information from or writing information to the information storage unit.

9. An information processing system comprising:
a client apparatus that executes an Internet browser program; and
a storage terminal that executes an Internet server program;
wherein the client apparatus includes:
   a request sending unit that sends a request to the storage terminal, the request including one of pieces of user identification information individually assigned to a plurality of users; and
wherein the storage terminal includes:
   an information storage unit that includes a plurality of storage areas having individually different identifiers assigned thereto;
   an association storage unit that stores the identifiers individually in association with the pieces of user identification information;
   a receiving unit that receives the request sent from the client apparatus;
   a sending unit that sends information to the client apparatus; and
   a processing unit that identifies an identifier associated with the piece of user identification information included in the request with reference to the association storage unit and that executes processing according to the request on a storage area having the identified identifier assigned thereto;
wherein each of the storage areas stores first information and second information, the first information being information that is displayed according to a procedure defined in the Internet browser program, and the second information being information that is output according to a procedure defined in a program different from the Internet browser program,
wherein the processing unit executes the processing according to the request by executing the Internet server program,
wherein when the request received from the client apparatus by the receiving unit is a request specifying the first information, the processing unit reads the specified first information from the storage area having the identified identifier assigned thereto, and sends the specified first information from the sending unit to the client apparatus according to a communication standard for exchange of information by the storage terminal, and wherein when the request received from the client apparatus by the receiving unit is a request specifying the second information, the processing unit reads the specified second information from the storage area having the identified identifier assigned thereto, and sends the second information from the sending unit to the client apparatus according to a read/write standard for reading information from or writing information to the information storage unit.

10. An information processing system comprising:
a client apparatus that executes an Internet browser program; and
a storage terminal that executes an Internet server program;
wherein the client apparatus includes:
   a request sending unit that sends a request to the storage terminal, the request including one of pieces of user identification information individually assigned to a plurality of users; and
wherein the storage terminal includes:
   an information storage unit that includes a plurality of storage areas having individually different identifiers assigned thereto;
   an association storage unit that stores the identifiers individually in association with the pieces of user identification information;
   a receiving unit that receives the request sent from the client apparatus;
   a sending unit that sends information to the client apparatus; and
   a processing unit that identifies the identifier associated with the piece of user identification information included in the request with reference to the association storage unit and that executes processing according to the request on the storage area having the identified identifier assigned thereto;
wherein each of the storage areas stores first information and second information, the first information being information that is displayed according to a procedure defined in the Internet browser program, and the second information being information that is output according to a procedure defined in a program different from the Internet browser program,
wherein the processing unit executes the processing according to the request by executing the Internet server program, and when the request received from the client apparatus by the receiving unit is a request specifying the first information or the second information, the processing unit reads the specified first information or second information from the storage area having the identified identifier assigned thereto, and sends the first information or second information from the sending unit to the client apparatus according to a communication standard a read/write standard for reading information from or writing information to the information storage unit.

* * * * *